United States Patent

Ohashi et al.

Patent Number: 6,016,182

Date of Patent: *Jan. 18, 2000

[54] MOTION PICTURE FILM AND A TECHNIQUE FOR RECORDING AND/OR REPRODUCING DATA FROM SUCH MOTION PICTURE FILM

[75] Inventors: Masakazu Ohashi; Kozo Kaminaga; Kenji Takanashi; Toshiaki Setogawa; Teruyuki Yoshida; Katsuichi Tachi, all of Kanagawa, Japan

[73] Assignee: Sony Cinema Products Corporation, Culver City, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/352,755

[22] Filed: Dec. 2, 1994

[30] Foreign Application Priority Data

Dec. 7, 1993 [JP] Japan .................................. 5-340177

[51] Int. Cl.[7] .................................................. G03B 31/00
[52] U.S. Cl. .................................. 352/37; 352/27
[58] Field of Search ................... 352/27, 37, 5, 352/40, 44; 360/48; 371/10.2; 369/125

[56] References Cited

U.S. PATENT DOCUMENTS

| | | | |
|---|---|---|---|
| 4,188,616 | 2/1980 | Kazami et al. | 340/146.1 |
| 4,206,440 | 6/1980 | Doi et al. | 371/39 |
| 4,564,945 | 1/1986 | Glover et al. | 371/38 |
| 4,812,924 | 3/1989 | Fukami et al. | 360/32 |
| 4,907,215 | 3/1990 | Sako et al. | 369/59 |
| 5,111,463 | 5/1992 | Zook | 371/39.1 |
| 5,172,380 | 12/1992 | Odaka | 371/37 |
| 5,194,996 | 3/1993 | Shores | 360/48 |
| 5,327,182 | 7/1994 | Kohut et al. | 352/27 |
| 5,404,249 | 4/1995 | Seki | 360/48 |
| 5,455,814 | 10/1995 | Sako | 369/59 |
| 5,471,263 | 11/1995 | Odaka | 352/27 |
| 5,504,759 | 4/1996 | Inoue et al. | 371/37.4 |
| 5,537,165 | 7/1996 | Miyamori et al. | 352/27 |
| 5,550,603 | 8/1996 | Yoshimura et al. | 352/27 |

FOREIGN PATENT DOCUMENTS

| | | |
|---|---|---|
| 0 544 090 A1 | 6/1993 | European Pat. Off. . |
| 0 574 136 A2 | 12/1993 | European Pat. Off. . |
| WO 91/16709 | 10/1991 | WIPO . |

*Primary Examiner*—Safet Metjahic
*Assistant Examiner*—John Chizmar
*Attorney, Agent, or Firm*—Frommer Lawrence & Haug, LLP.; William S. Frommer; Dennis M. Smid

[57] ABSTRACT

A motion picture film having digital audio data recorded in at least one sound track thereof. Such digital audio data includes a plurality of bytes of data each having 8 bits of data. Each respective bit of each byte of audio data is recorded in a sound track of the film in the film running direction and each byte is arranged side-by-side in a direction normal to the film running direction to form a compression processing block. C1 parity data is added to each such compression processing block and C2 parity data is added after a predetermined interval of plural compression processing blocks. Error correction may be performed by utilizing the C1 and C2 parity data for each compression processing block and at the predetermined interval of plural compression blocks.

17 Claims, 27 Drawing Sheets

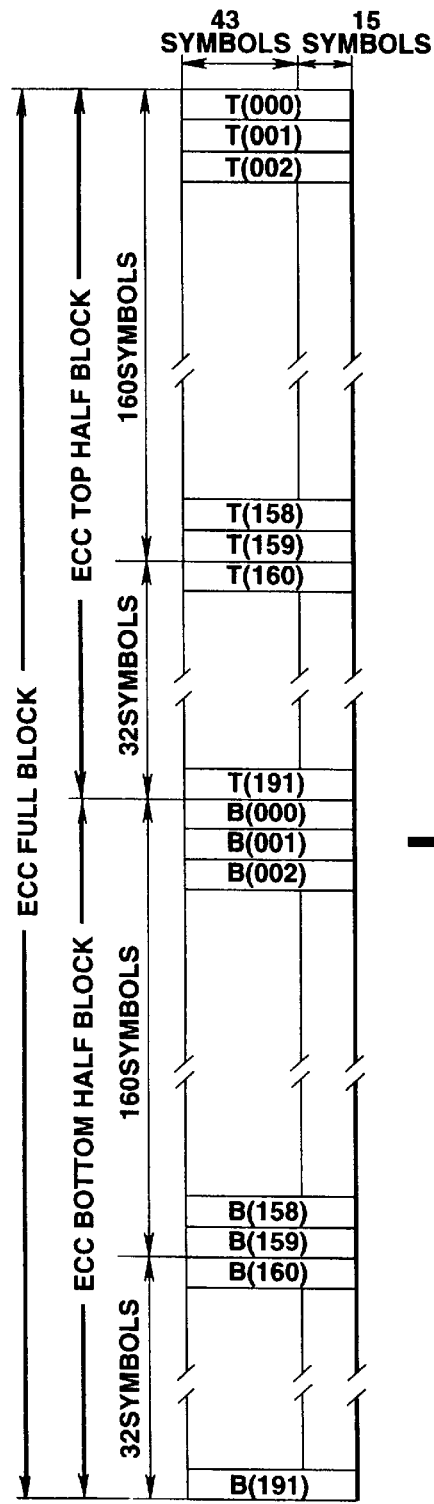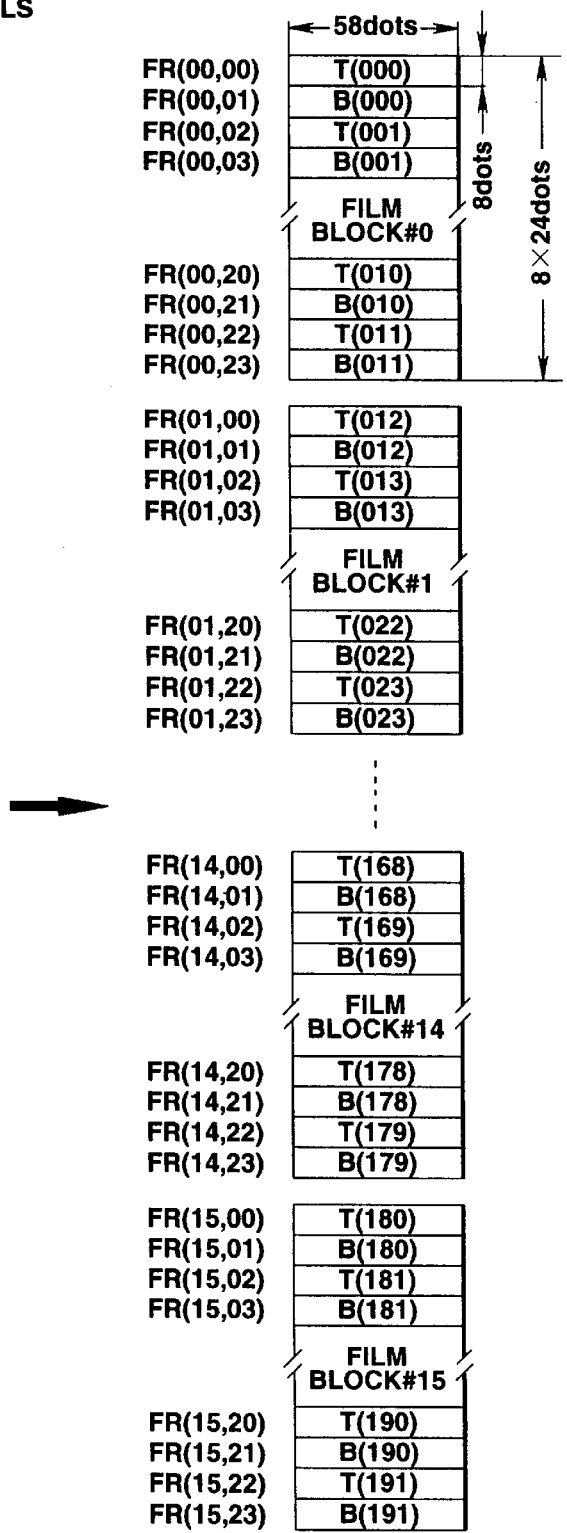
FIG. 15A FIG. 15B

MOTION PICTURE FILM AND A TECHNIQUE FOR RECORDING AND/OR REPRODUCING DATA FROM SUCH MOTION PICTURE FILM

BACKGROUND OF THE INVENTION

1. Field of the Invention

The present invention relates to a motion picture film and to a technique for recording and/or reproducing digital data onto and/or from a sound track of such motion picture film.

2. Description of the Prior Art

Conventional motion picture film may include picture recording regions respectively arranged in a plurality of frames at an approximate mid-portion of the film and two series or rows of film take-up holes (perforations) respectively located on either side of each picture recording region. Such motion picture film may further include a linear analog sound track located between the picture recording regions and one row of the perforations which extends in a film take-up direction. Analog signals may be recorded onto such analog sound track by the use of analog recording techniques.

Due to the recent progress in digital technology, audio information or data associated with a motion picture may be digitally recorded onto a motion picture film. However, the recording position of the picture recording regions and the analog sound track are standardized by the Society Motion Picture and Television Engineers (SMPTE), an association in the U.S.A. of motion picture and television engineers. As a result, digitized audio information or data is recorded in positions other than the picture recording regions and the analog sound track. More specifically, two digital sound tracks are provided in the film running direction of the motion picture film for recording digitized audio data therein and for reproducing the recorded digitized audio data therefrom. Each of such digital sound tracks is located between the perforations and a respective one of the lateral film edges. The audio data includes audio data for a right channel and audio data for a left channel which are each respectively recorded in a linear manner in one of the two digital sound tracks. Each of such audio data includes synchronization data, audio data and tracking patterns which are recorded in a direction normal to the film running direction in the digital sound tracks. The synchronization data or pattern is formed at the leading end of a block made up of a predetermined number of data followed by the audio data which is recorded block-by-block. The tracking patterns are recorded at each of the recording start and the recording end portions. Such tracking patterns are recorded in stripes on both sides of the digital sound tracks extending along the film running direction.

A reproducing apparatus for reproducing the digitized audio data from the motion picture film may include two CCD line sensors adapted for scanning the digital sound tracks so as to respectively read out the audio data recorded in the channels. Each of the CCD line sensors has a one-line reading region and is arranged so as to read such line in a direction normal to the film running or proceeding direction. During reproduction, light is radiated from the back surface of the motion picture film. As a result, the synchronization data, audio date and the tracking patterns recorded on the digital sound tracks of the motion picture film are illuminated and radiated on the reading regions of each of the CCD line sensors.

The CCD line sensors receive the illuminated synchronization data, audio data and the tracking patterns and convert them into electrical signals which are supplied to a data processor included in the reproducing apparatus. The data processor reproduces the audio data on a block basis in synchronization with the synchronization data and routes the reproduced audio data to a digital-to-analog (D/A) converter, which may be included in the reproducing apparatus, so as to convert the audio data to analog audio signals. Such analog audio signals may be thereafter supplied to a speaker unit. As a result, the speech corresponding to the digital audio data is provided by way of the speaker unit.

As previously described, the data processor receives signals corresponding to the tracking patterns from the CCD line sensors. Such signals are utilized by the data processor to provide tracking control data. More specifically, the tracking pattern is recorded at the recording start position and the recording end position for one-line of audio data. The data processor detects a level difference between, for example, the tracking pattern reproduced at the recording s;tart position and that reproduced at the recording end position, so as to determine or detect a tracking error. The readout timing of the CCD line sensor is variably controlled in response to the tracking error. As a result, tracking error may be corrected so as to effect reproduction of the audio data at all times in the so-called just-track condition.

As is to be appreciated, scratches may be produced on the motion picture film. Such scratches may be identified or classified as longitudinal scratches which extend along the film running direction and transverse scratches which extend in a direction substantially normal (or at right angles to) the film running direction. Due to the manner in which the motion picture film is typically handled and/or moved, longitudinal scratches are produced therein more frequently than transverse scratches.

The longitudinal scratches may adversely affect the reproduction of digital audio data recorded on the conventional motion picture film. That is, audio data and so forth are recorded in the digital sound tracks of such motion picture film in a direction normal (at right angles to) the proceeding direction of the motion picture film. As a result, longitudinal scratches may cause the destruction of audio data across a plurality of lines, thereby making the reproduction thereof relatively difficult, if not impossible, to obtain and/or reducing the quality of the reproduced data. Further, the transverse scratches may also adversely affect the reproduction of the audio data.

Thus, the prior art has failed to provide a motion picture film and/or a technique for recording digital audio data on a motion picture film such that scratches, such as longitudinal and transverse scratches which may be produced on the film, do not adversely affect the reproduction of the recorded digital audio data.

OBJECTS AND SUMMARY OF THE INVENTION

An object of the present invention is to provide a motion picture film and a technique for recording digital audio data onto and/or reproducing the digital audio data from such motion picture film which overcomes the problems associated with the prior art.

More specifically, it is an object of the present invention to provide a motion picture film and a technique for recording digital audio data onto and/or reproducing the digital audio data from such motion picture film such that adverse affects which may otherwise occur during the reproduction of the audio data due to longitudinal or transverse scratches which may be produced on the motion picture film may be eliminated or minimized.

Another object of the present invention is to provide a motion picture film and a technique as aforesaid in which the audio data includes a plurality of bytes of data each having a plurality of data bits and in which each bit of each respective byte is recorded in a recording area of a digital sound track of the motion picture film in a film running direction.

A further object of the present invention is to provide a motion picture film and a technique as aforesaid in which parity coding data is recorded on the motion picture film so as to enable error correction to be performed on the audio data.

A still further object of the present invention is to provide a motion picture film and a technique as aforesaid in which the audio data is interleaved in a predetermined manner and recorded in lines of the recording area of the digital sound track(s).

In accordance with one aspect of the present invention, a motion picture film is provided comprising at least one digital sound track extending along a film running direction having a recording area with lines extending along a direction normal to the film running direction and columns extending along the film running direction for recording audio data and coding data therein. The audio data is recorded in a predetermined data pattern such that n-bits of the audio data are recorded in the recording area along the film running direction. The coding data may be utilized in performing error correction of the audio data on a n-bit basis.

In accordance with another aspect of the present invention, a technique is provided for recording digital data on a motion picture film including at least one digital sound track extending along a film running direction having a recording area with lines extending along a direction normal to the film running direction and columns extending along the film running direction. Audio data is recorded in a predetermined data pattern in the recording area such that n-bits of the audio data are recorded therein in the film running direction. Coding data is recorded in the recording area which may be utilized in performing error correction of the audio data on a n-bit basis.

By recording audio data on a n-bit basis in the film running direction of the digital sound tracks in accordance with the present invention, data destruction may be limited to a minimum number on the order of n bits even upon the occurrences of longitudinal scratches which may frequently occur with the use of the film.

Additionally, with the motion picture film of the present invention, since audio data and a product code for effecting error correction is recorded on the digital sound track(s), error correction may be performed on the audio data despite the occurrences of longitudinal and transverse scratches so as provide a relatively accurate reproduction of the audio data.

Other objects, features and advantages according to the present invention will become apparent from the following detailed description of the illustrated embodiments when Lead in conjunction with the accompanying drawings in which corresponding components are identified by the same reference numerals.

BRIEF DESCRIPTION OF THE DRAWINGS

FIG. 15 is a diagram to which reference will be made in explaining the interleaving of plural compression blocks;

DETAILED DESCRIPTION OF THE PREFERRED EMBODIMENTS

Figure 1:
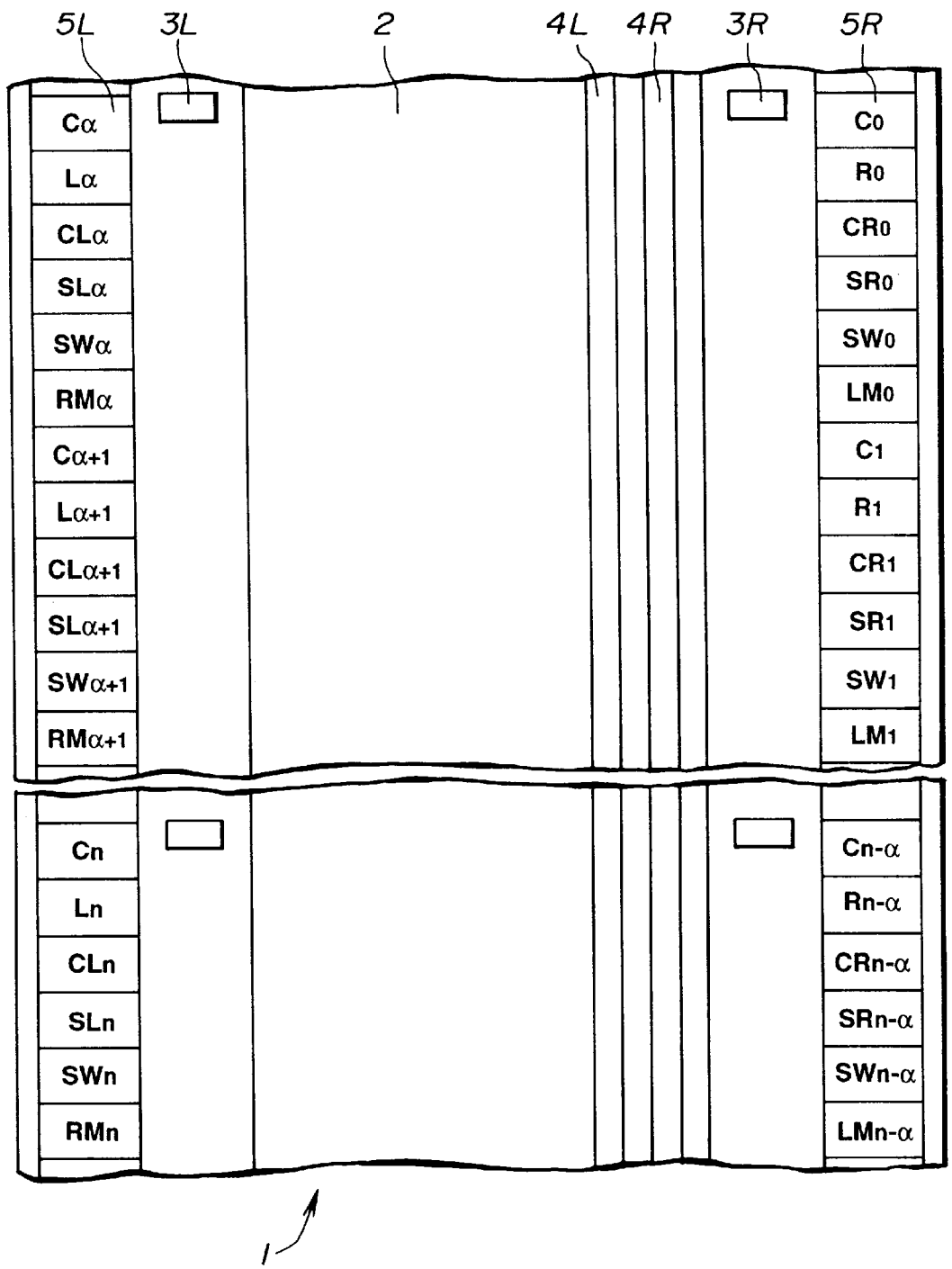
FIG. 1 illustrates a recording format for a motion picture film according to an embodiment of the present invention.

FIG. 1 illustrates a motion picture film 1 in accordance with an embodiment of the present embodiment. As shown therein, such motion picture film includes a picture recording area 2 for recording a picture or image to be projected, perforation areas 3L and 3R for transporting the motion picture film during a projection operation, analog sound tracks 4L and 4R for recording analog audio signals which may be reproduced therefrom with conventional equipment, and digital sound tracks 5L and 5R for recording multi-channel digital audio data.

Left and right channels of analog audio data or signals are respectively recorded in the analog sound tracks 4L and 4R. Left and right channels of digitized audio signals; are respectively recorded in a predetermined manner in the digital sound tracks 5L and 5R. More specifically, a center channel (C), a left channel (L), a center left channel (CL), a surround left channel (SL), a sub-woofer channel (SW) and a right mix channel (RM), are recorded in this order in the digital sound track 5L. The right mix channel (RM) may be formed from a right channel (R), a center right channel (CR) and a surround right channel (SR). That is, C, L, CL, SW and RM channels of data are recorded as a left-channel or route of audio data in the digital sound track 5L. Further, a center channel (C), a right channel (R), a center right channel (CR), a surround right channel (SR), a sub-woofer channel (SW) and a left mix channel (LM) are recorded in this order in the digital sound track 5R. The left mix channel (LM) may be formed from a left channel (L), a center left channel (CL) and a surround left channel (SL). That is, C, R, CR, SR, SW and LM are recorded as a right-channel or route of audio data in the digital sound track 5R.

The suffixes "n" or "n-α" of the channels of the digital sound tracks of the motion picture film 1 of FIG. 1 indicate the order in a time sequence. For example, Cn of the digital sound track 5L indicates that the audio data is in the nth position in the time sequence of the center channel (C), while Cn-α of the digital sound track 5R indicates that the audio data is in the (n-α)th position in the time sequence of the center channel (C).

Figure 2:
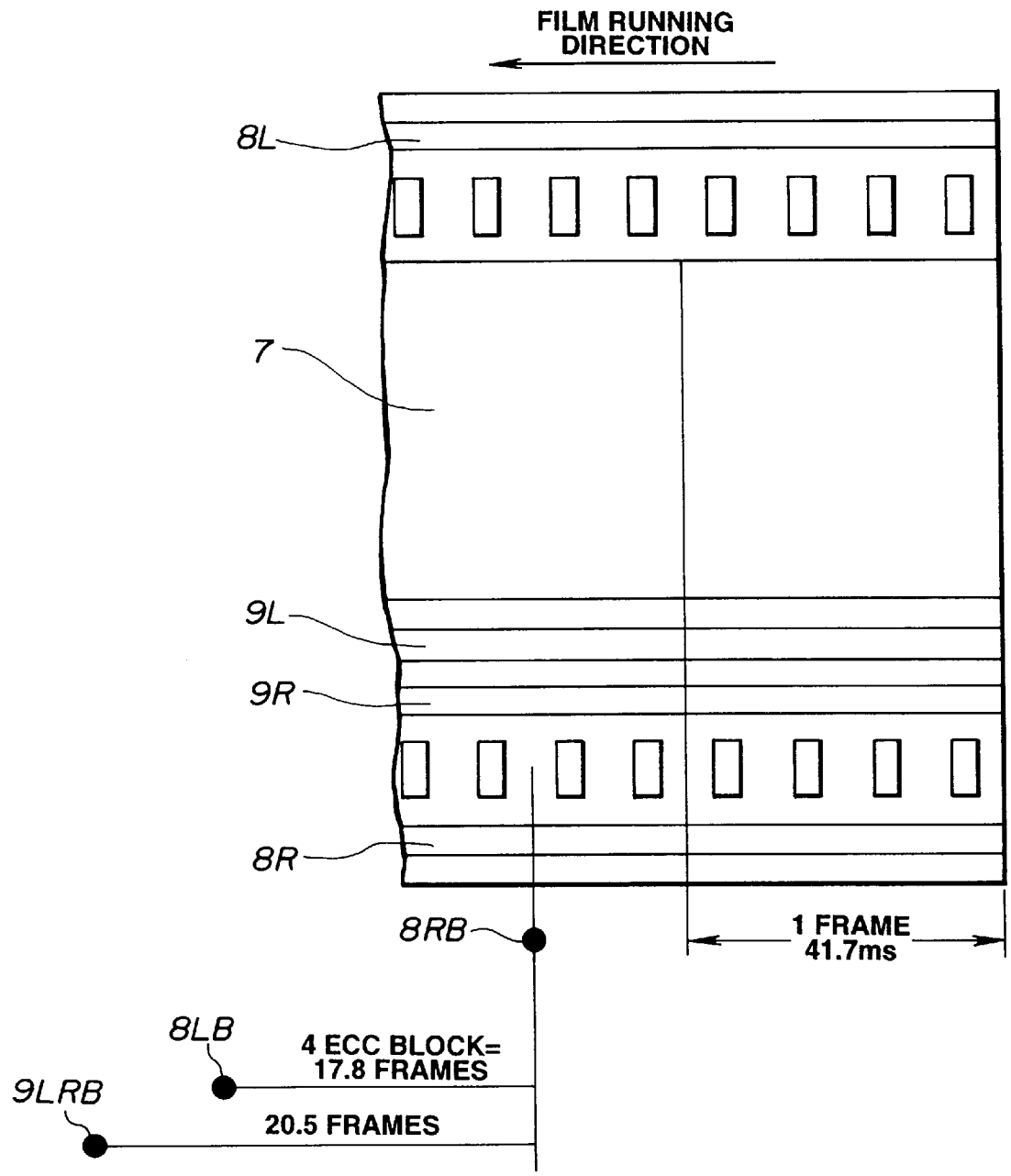
FIG. 2 is a diagram to which reference will be made in explaining a preset shift between left and right channels of audio data in the motion picture film of FIG. 1.

As illustrated in FIG. 1, the data recorded on the digital sound track 5R lags behind the data recorded on the digital sound track 5L. The amount of such lagging, or the pre-set shift, between the data recorded in the left and right channels is further illustrated in FIG. 2. More specifically, as shown in FIG. 2, the audio data recorded at a reference point 8RB on a digital sound track 8R at a center of a frame 7 of a motion picture film has the same timing as, or corresponds to, the audio data recorded on a digital sound track 8L at a position 8LB, which is ahead of the reference point 8RB by 4 ECC blocks (or 17.8 frames). As a result, the audio data at the position 8LB on the digital sound track 8L is reproduced earlier than the audio data at the position 8RB on the digital sound track 8R. As further shown in FIG. 2, the same timing audio data may be recorded on one of the two analog sound tracks 9L and 9R as, for example, on the analog sound track 9L at a position 9LRB which is 20.5 frames ahead of the reference point 8RB.

Figure 3:
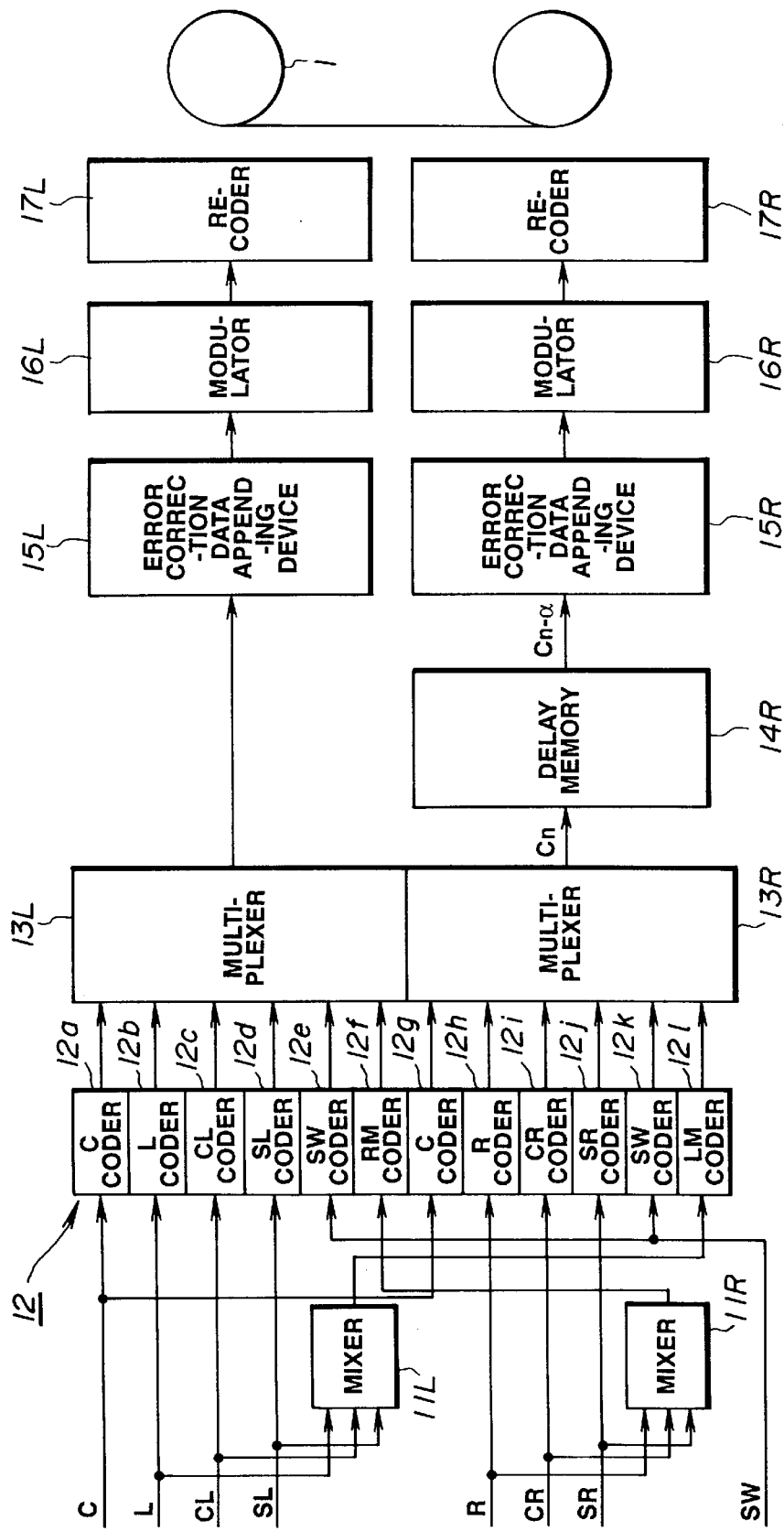
FIG. 3 is a block diagram illustrating a recording apparatus for the motion picture film of FIG. 1 according to an embodiment of the present invention.
Figure 4:
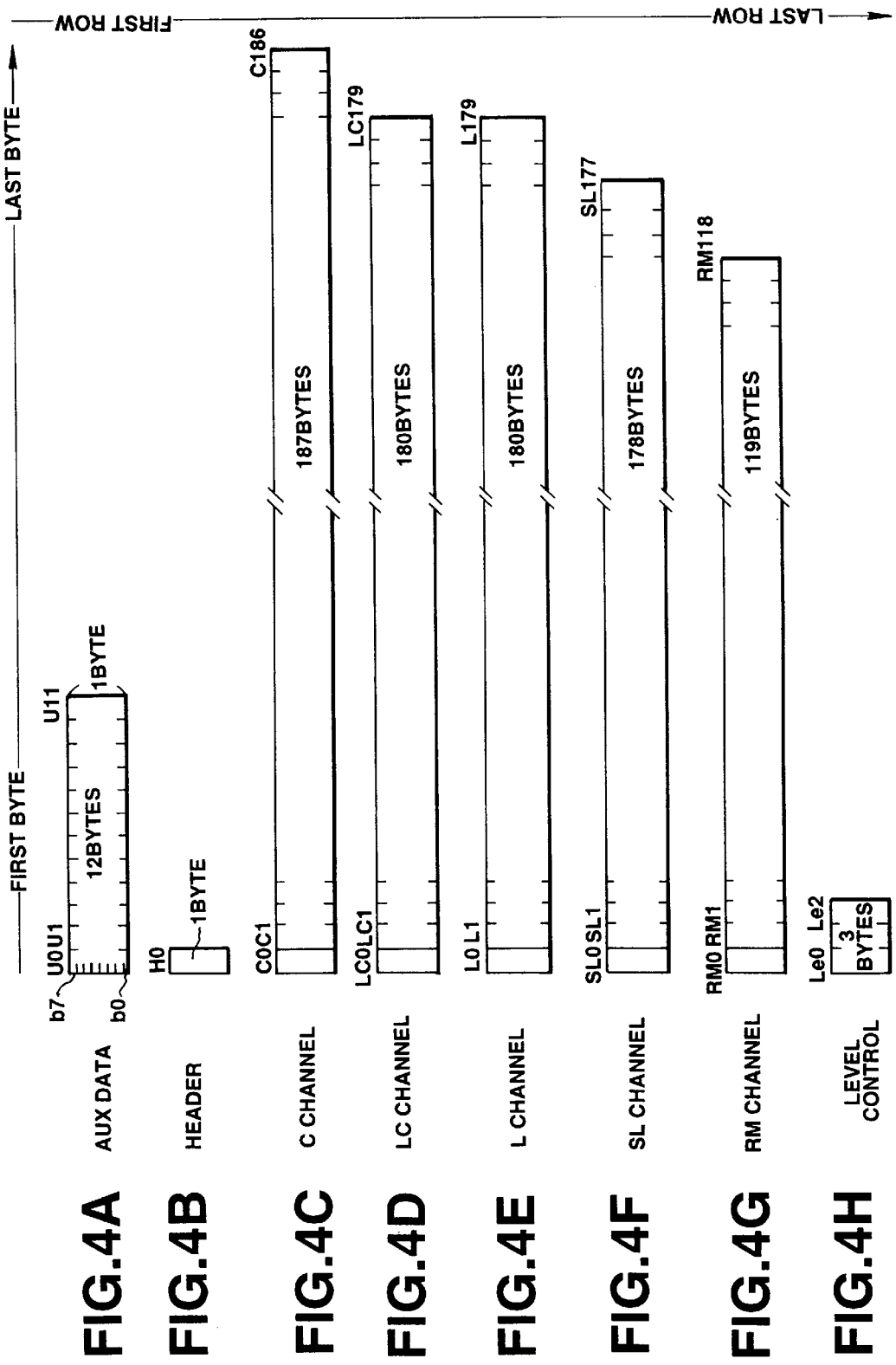
FIGS. 4a to 4h illustrate an arrangement of the left channel of audio data in a compression processing block of the motion picture film of FIG. 1 according to an embodiment of the present invention.

A recording apparatus 500 for recording digital audio data onto motion picture film according to an embodiment of the present invention is illustrated in FIG. 3. Such recording apparatus generally includes mixers 11L and 11R, a plurality of coders 12a–12l, multiplexers 13L and 13R, a delay memory 14R, error correction data appending devices 15L and 15R, modulators 16L and 16R, and recoders 17L and 17R, which are connected together as shown in FIG. 3. The mixer 11L is adapted to receive L-channel, CL-channel, and SL-channel data and for generating therefrom the left mix channel (LM) data. Such left mix channel (LM) data is supplied to the LM coder 121. Similarly, the mixer 11R is adapted to receive the R-channel, CR-channel, and SR-channel data and for generating therefrom the right mix channel (RM). Such right mix channel (RM) data is supplied to the RM coder 12f. The C-channel, L-channel, CL-channel, SL-channel and SW-channel data are supplied to coders 12a to 12e, and the R-channel CR-channel, SR-channel and SW-channel data are supplied to coders 12h to 12k. Coders 12a to 12f are adapted for coding left-channel audio data and for supplying output signals therefrom to the left channel multiplexer 13L which, in turn, supplies a serial output left channel signal to the error correction data appending device 15L. The coders 12g to 12l are adapted for coding right-channel audio data and for supplying output signals therefrom to the right channel multiplexer 13R which, in turn, supplies a serial output right channel signal to the delay memory 14R. Such delay memory is adapted to delay the received signal by a predetermined amount and to supply a delayed output signal to the error correction data appending device 15R. The error correction data appending devices 15L and 15R are adapted to respectively add or append error correction data (ECC) to the left and right channels of audio data and to respectively supply therefrom output audio data signals having error correction codes to the modulators 16L and 16R. The modulators 16L and 16R are adapted to modulate the received signals in a predetermined manner and to supply respective modulated output signals to the recorders 17L and 17R which, in turn, record the modulated audio data of the respective channels onto the digital sound tracks 5L and 5R of the film 1.

The operation of the recording apparatus 500 in conjunction with the motion picture film 1 will now be described.

As shown in FIG. 3 and as previously described, the center channel (C) of audio data is supplied to the coders 12a and 12g, and the subwoofer channel (SW) of audio data is supplied to the coders 12e and 12k. The L, CL and SL channels of audio data are respectively supplied to the coders 12b to 12d, while the R, CR and SR channels of audio data are respectively supplied to the coders 12h to 12j. The L, CL and SL channels of audio data are supplied to the mixer 11L, while the R, CR and SR channels of audio data are supplied to the mixer 11R. The mixer 11L forms the left mix channel (LM) of audio data from the received L, CL and SL channels of audio data and supplies the same to the coder 12l. Similarly, the mixer 11R forms the right mix channel (RM) of audio data from the received R, CR and SR channels of audio data and supplies the same to the coder 12f.

The coders 12a to 12f process the received C, L, CL, SL, SW and RM channels of data as the left channel audio data with high-efficiency coding (such as adaptive transform acoustic coding (ATRAC) which is a highly effective coding technique developed for the so-called mini-disc) combined from sub-band coding, orthogonal transform coding and bit allocation so as to compress the amount of data by a predetermined amount, such as by one fifth, and supply the respective compressed data signals to the multiplexer 13L. Similarly, the coders 12g to 12l process the received C, R, CR, SR, SW and LM channels of data as the right channel audio data with high-efficiency coding (ATRAC) combined from sub-band coding, orthogonal transform coding and bit allocation so as to compress the amount of data by a predetermined amount (such as one fifth) and supply the respective compressed data signals to the multiplexer 13R.

The multiplexer 13L receives the left channel audio data in parallel from the coders 12a to 12f and performs a serial conversion on such received data in the sequence of C, L, CL, SL, SW, RM. The multiplexer 13L supplies the obtained serial data to the error correction data appending device 15L. Similarly, the multiplexor 13R receives the right channel audio data in parallel from the coders 12g to 12l and performs a serial conversion on such received data in the sequence of C, R, CR, SlR, SW and LM. The multiplexer 13R supplies the obtained serial data to the delay memory 14R. The delay memory 14R delays the received right channel audio data by a predetermined amount, such as by 17.8 frames, so as to provide a shift of 17.8 frames between the recording positions of the left and right channels of audio data, in a manner as previously described. The delayed audio data from the delay memory 14R is supplied to the error correction data appending circuit 15R.

The error correction data appending circuits 15L and 15R add C2 parity and C1 parity error correcting signals, in accordance with a predetermined code such as a cross-interleave Reed Solomon code, to the received audio data and respectively supply the produced audio data to the modulators 16L and 16R. The modulators 16L and 16R add synchronization data and tracking patterns and so forth to the received audio data and respectively supply modulated output data to the recorders 17L and 17R. Such modulated audio data is respectively recorded by the recoders 17L and 17R onto the digital sound tracks 5L and 5R of the motion picture film 1 for each film block as hereinafter more fully described. Such digital recording is performed in units of a compression processing block.

FIGS. 4a to 4h, 5, 6a to 6i and 7 illustrate a compression processing block of audio data for the motion picture film according to an embodiment of the present invention. More specifically, FIGS. 4a to 4h and 5 correspond to the left channel of audio data of such compression processing block, whereas FIGS. 6a to 6i and 7 correspond to the right channel thereof. The left channel of audio data of the compression block will be initially described below, after which the right channel thereof will be described.

As shown in FIGS. 4a to 4h, recorded in the left channel audio data of each compression processing block are 12 bytes of auxiliary data (FIG. 4a), a 1-byte header HO (FIG. 4b), 187 bytes of center channel audio data C0 to C186 (FIG. 4c), 180 bytes of left center channel audio data LC0 to LC179 (FIG. 4d), 180 bytes of left channel audio data L0 to L179 (FIG. 4e), 178 bytes of surround left channel audio data SL0 to SL177 (FIG. 4f), 119 bytes of right mix channel audio data RM0 to RM118 (FIG. 4g), and 3 bytes of level controller data (FIG. 4h). Each byte of the level controller data respectively indicates the audio data level of one of the left channel, the left center channel and the surround left channel.

Figure 5:
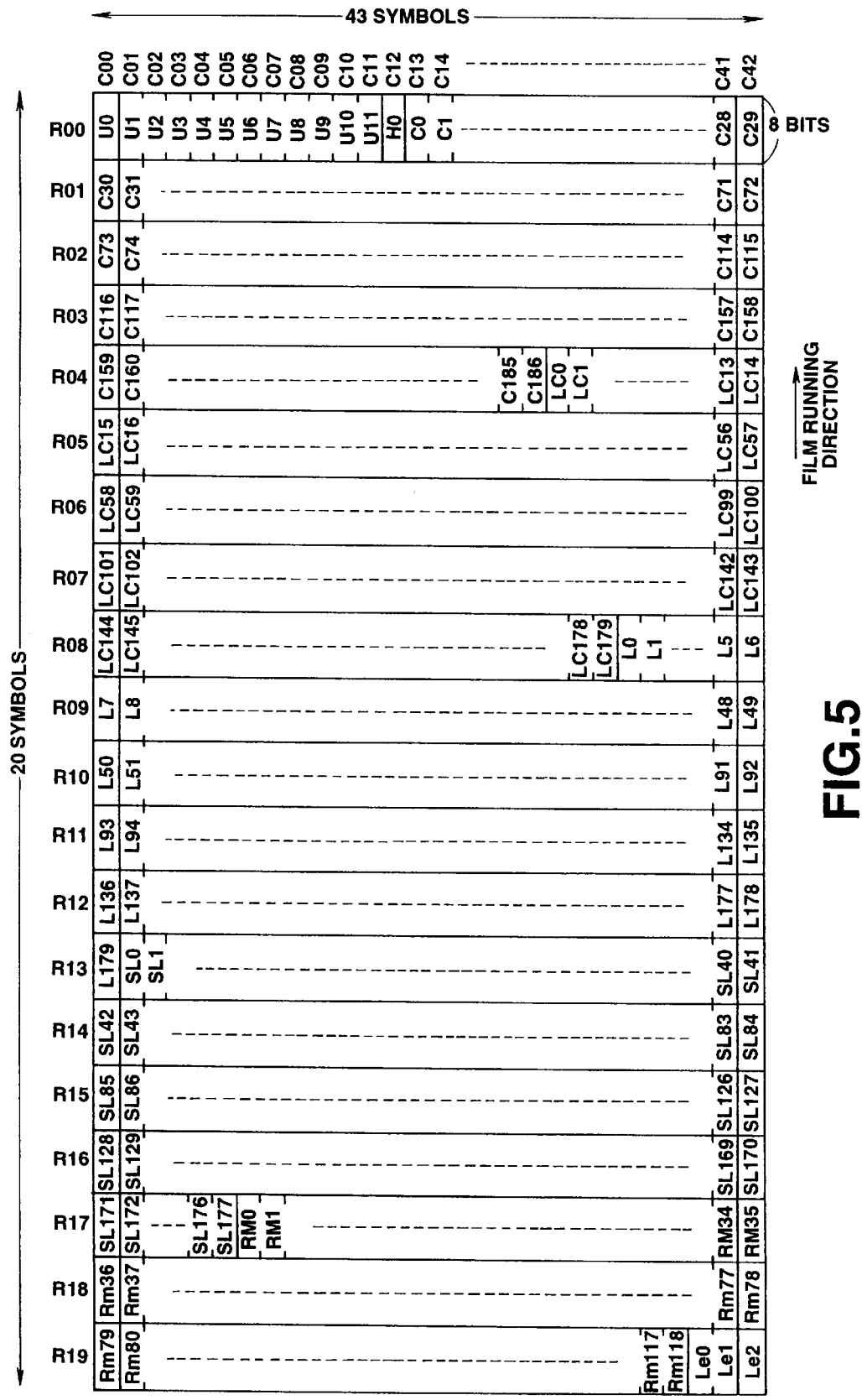
FIG. 5 illustrates the left channel of audio data of FIGS. 4a to 4h in a compression processing block of the motion picture film of FIG. 1.
Figure 6:
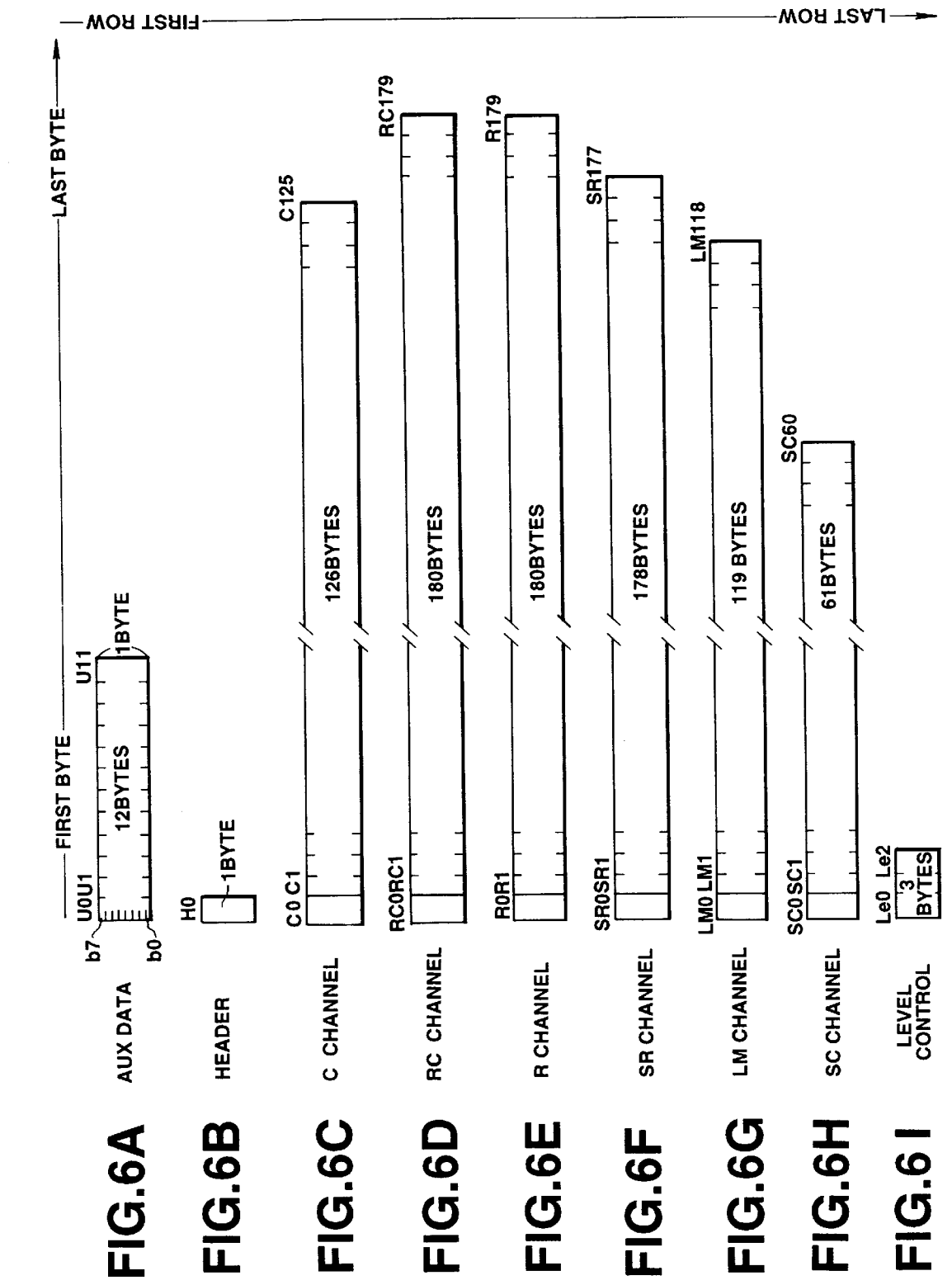
FIGS. 6a to 6i illustrate an arrangement of the right channel of audio data in a compression processing block of the motion picture film of FIG. 1 according to an embodiment of the present invention.

It is be noted that 1 byte=1 symbol=8 bits. Further, as indicated in FIG. 4a, each row of data includes 1 byte, or 8 bits (that is, bits b0 to b7), of data which are arranged in columns, that is, in the film running direction which is substantially perpendicular or normal to the direction of the rows. Thus, as shown in FIG. 5, each audio data of each left channel compression processing block is recorded symbol-by-symbol along the film running direction and such that one-symbol of audio data is adjacent to another in a direction normal (at right angles) to the film running direction. Such arrangement of audio data in this left channel compression processing block will now be described with reference to FIG. 5.

Each compression processing block includes the data previously described with reference to FIGS. 4a to 4h arranged in a plurality of rows or data strings, such as 20 data strings R00 to R19, in which each of these data strings includes a plurality of symbols of data, such as 43 symbols as shown in FIG. 5. More specifically, as shown therein, the 12 symbols of auxiliary data U0 to U11 are initially recorded in the first data string R00. After the auxiliary data, the 1 symbol header H0 and 30 of the 187 symbols of center channel audio data are recorded in this sequence. Forty-three symbols of the center channel audio data are recorded in each of the second to fourth data strings R01 to R03, that is, the center channel audio data C30 to C72 is recorded in data string R01, data C73 to C115 is recorded in data strings R02, and data C116 to C158 is recorded in the data string R03. The remaining 28 symbols of the center channel audio data, theat is, data C159 to C186, are recorded in the fifth data string R04, followed by 15 of the 180 symbols of left center channel audio data LC0 to LC14. Forty-three symbols of the left center channel audio data are recorded in each of the sixth to eighth data strings R05 to R07, that is, the left center channel audio data LC15 to LC57 is recorded in data string R05, data LC58 to LC100 is recorded in data string R06, and data LC101 to LC143 is recorded in data string R07. The remaining 36 symbols of the left center channel audio data, that is, data LC144 to LC179, are recorded in the ninth data string R08, followed by 7 of the 180 symbols of the left channel audio data L0 to L6. Forty-three symbols of the left channel audio data are recorded in each of the tenth to thirteenth data strings R9 to R12, that is, the left channel audio data L7 tc, L49 is recorded in data string R09, data L50 to L92 is recorded in data string R10, data L93 to L135 is recorded in data string R11, and data L136 to L178 is recorded in data string R12. The remaining one symbol of the left channel audio data, that is, data L179, is recorded in the fourteenth data string R13, followed by 42 of the 178 symbols of the surround left channel audio data SL to SL41. Forty-three symbols of the surround left channel audio data are recorded in each of the fifteenth to seventeenth data strings R14 to R16, that is, the surround left channel audio data SL42 to SL84 is recorded in the data string R14, the data SL85 to SL127 is recorded in data string R15, and the data SL128 to SL170 is recorded in data string R16. The remaining seven symbols of the surround left channel, that is, the data SL171 to SL177, are recorded in the eighteenth data string R17, followed by 36 of the 119 symbols of the right mix channel audio data RM0 to RM35. Forty-three symbols of the right mix channel audio data, that is, data RM36 to RM78, are recorded in the nineteenth data string R18. The remaining 40 symbols of the right mix channel audio data, that is, data RM79 to RM118, are recorded in the twentieth data string R19, followed by the 3 symbols of the level controller data Le0 to Le2.

The right channel audio data of the compression processing block will now be described.

As shown in FIGS. 6a to 6i, recorded in the right channel audio data of each compression processing block are 12 bytes of auxiliary data (FIG. 6A), a 1 byte header H0 (FIG. 6b), 126 bytes of center channel audio data C0 to C125 (FIG. 6c), 180 bytes of right center channel audio data RC0 to RC179 (FIG. 6d), 180 bytes of right channel audio data R0 to R179 (FIG. 6e), 178 bytes of surround right channel audio data SR0 to SR177 (FIG. 6f), 119 bytes of left mix channel audio data LM0 to LM118 (FIG. 6g), 61 bytes of surround channel audio data SW0 to SW60 (FIG. 6h), and 3 bytes of level controller data (FIG. 6i). Each byte of the level controller data respectively indicates the audio data level of one of the right channel, the right center channel and the surround right channel.

Figure 7:
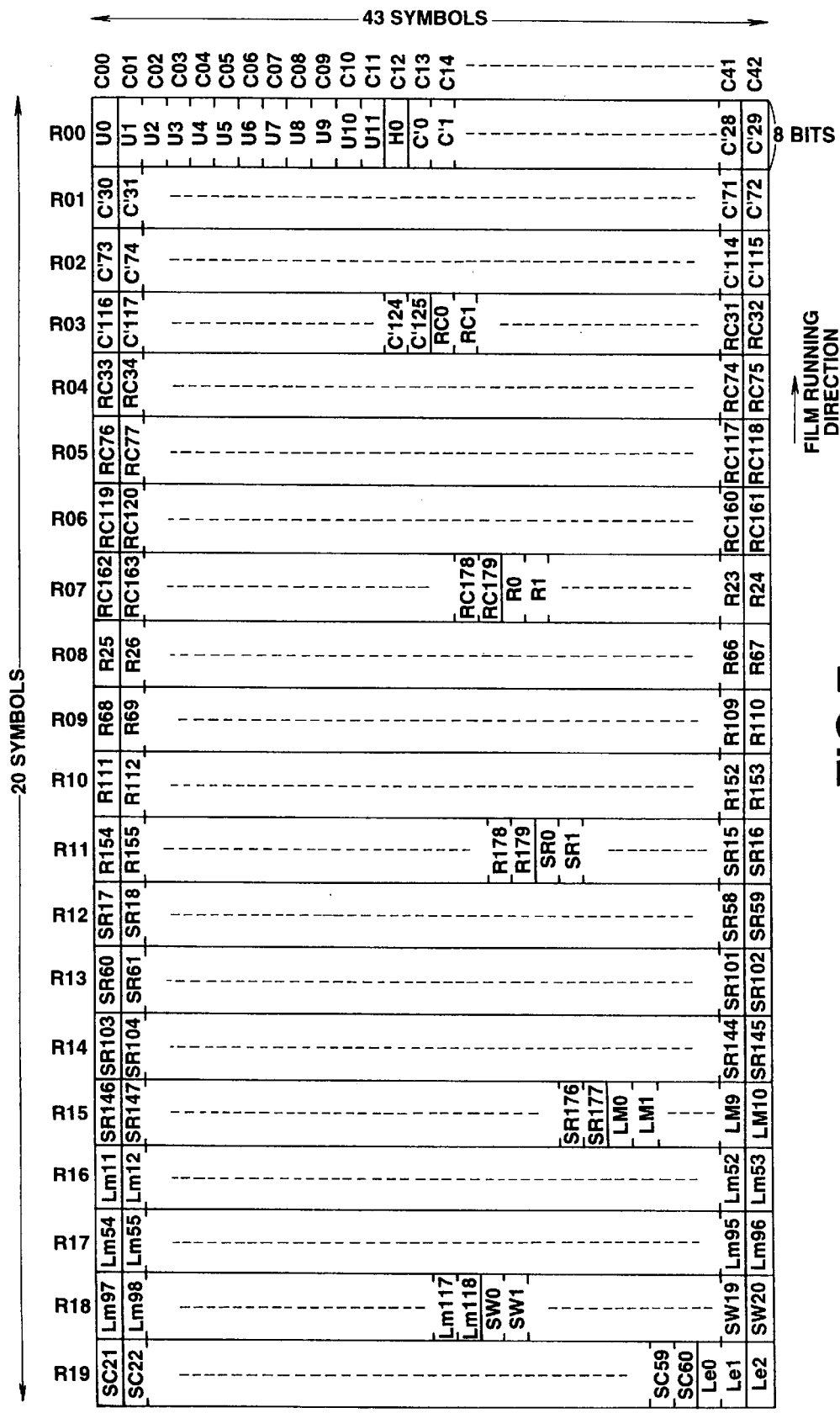
FIG. 7 illustrates the right channel of audio data of FIGS. 6a to 6i in a compression processing block of the motion picture film of FIG. 1.
Figure 8:
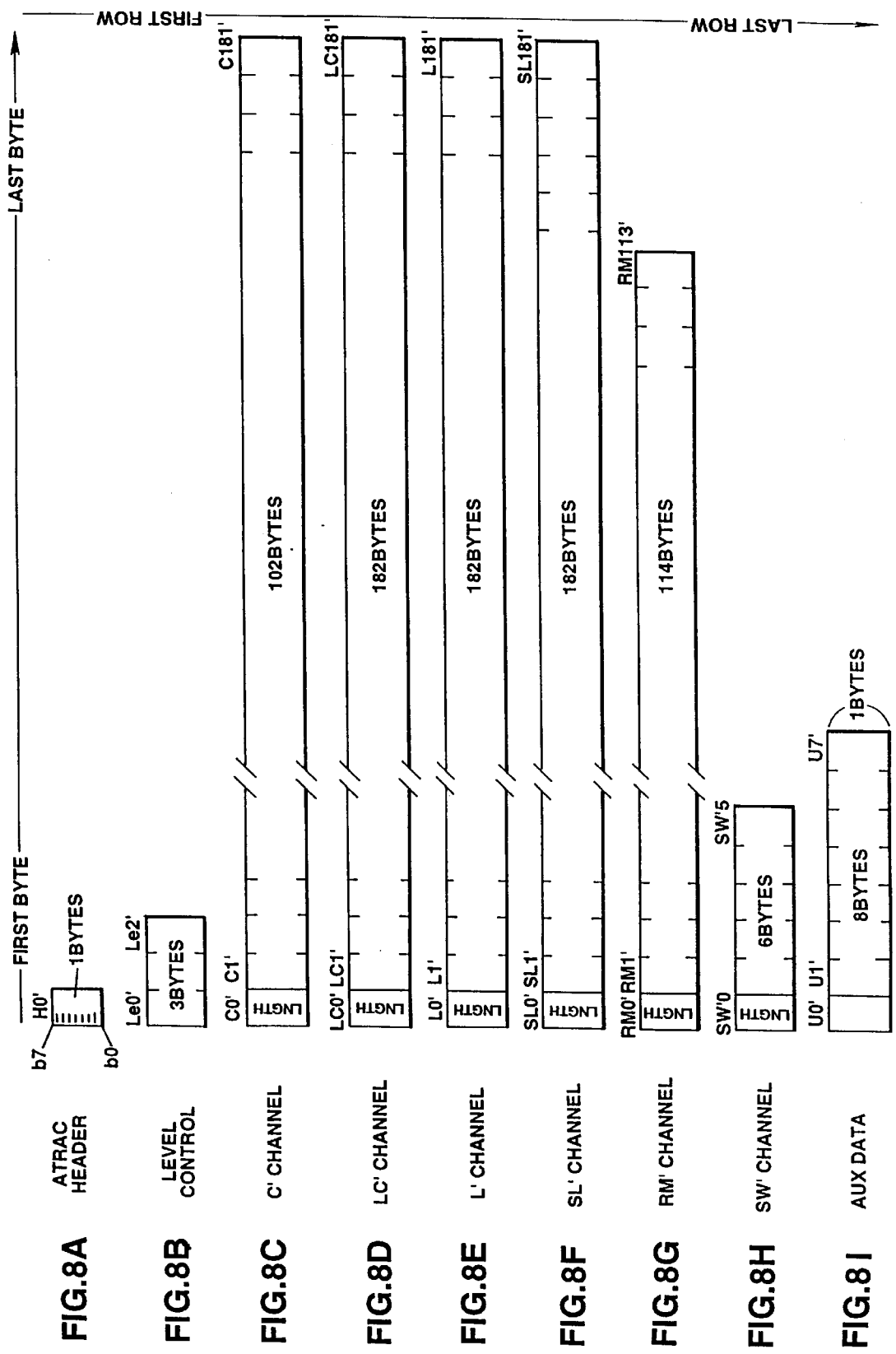
FIGS. 8a to 8i illustrate another arrangement of the left channel of audio data in a compression processing block of the motion picture film of FIG. 1 according to another embodiment of the present invention.

Further, in a manner similar to that previously described with reference to the left channel, 1 byte=1 symbol=8 bits. Additionally, as indicated in FIG. 6a, each row of data includes 1 byte, or 8 bits (that is, bits b0 to b7), of data which are arranged in columns, that is, in the film running direction which is substantially perpendicular or normal to the direction of the rows. Thus, as shown in FIG. 7, each audio data of each right channel compression processing block is recorded symbol-by-symbol along the film running direction and such that one-symbol of audio data is adjacent to another in a direction normal (at right angles) to the film running direction. Such arrangement of audio data in this right channel compression processing block will now be described with reference to FIG. 7.

Each compression processing block includes the data previously described with reference to FIGS. 6a to 6i arranged in a plurality of rows or data strings, such as 20 data strings R00 to R19, in which each of these data strings includes a plurality of symbols of data, such as 43 symbols as shown in FIG. 7. More specifically, as shown therein, the 12 symbols of auxiliary data U0 to U11 are initially recorded in the first data string R00, followed by the 1 symbol header H0 and 30 of the 126 symbols of center channel audio data in this sequence. Forty-three symbols of the center channel audio data are each recorded in the second and third data strings R01 and R02, that is, the center channel audio data C30 to C72 is recorded in the data string R01 and the data C73 to C115 is recorded in the data string R02. The remaining ten symbols of the center channel audio data, that is, data C116 to C125, are recorded in the fourth data string R03, followed by 33 of the 180 symbols of the right center channel audio data RC0 to RC32. Forty-three symbols of the right center channel audio data are each recorded in the fifth to seventh data strings R04 to R06, that is, the right center channel audio data RC33 to RC75 is recorded in the data string R04, data RC76 to RC118 is recorded in the data string R05, and data RC119 to RC161 is recorded in the data string R06. The remaining 18 symbols of the right center channel audio data, that is, data RC162 to RC179, are recorded in the eighth data string R07, followed by 25 of the 180 symbols of the right channel audio data R00 to R24. Forty-three symbols of the right channel audio data are each recorded in the ninth to eleventh data strings R8 to R10, that is, the right channel audio data R25 to R67 is recorded in the data string R08, data R68 to R110 is recorded in the data string R09, and data R111 to R153 is recorded in the data string R10. The remaining 26 symbols of the right channel audio data, that is, data R154 to R179, are recorded in the twelfth data string R11, followed by 17 of the 178 symbols of the surround right channel audio data SR0 to SR16. Forty-three symbols of the surround right channel audio data are each recorded in the thirteenth to fifteenth data strings R12 to R14, that is, the surround right channel audio data SR17 to SR59 is recorded in the data string R12, data SR60 to SR102 is recorded in the data string R13, and data SR103 to SR145 is recorded in the data string R14. The remaining 32 symbols of the surround right channel audio data, that is, data SR146 to SR177, are recorded in the sixteenth data string R15, followed by 11 of the 119 symbols of the left mix channel audio data LM0 to LM10. Forty-three symbols of the left mix channel audio data are each recorded in the seventeenth and eighteenth data strings R16 and R17, that is, the left mix channel audio data LM11 to LM53 is recorded in the data string R16, and data LM54 to LM96 is recorded in the data string R17. The remaining 22 symbols of the left mix channel audio data, that is, LM97 to LM118, are recorded in the nineteenth data string R18, followed by 21 of the 61 symbols of the surround channel audio data SW0 to SW20. The remaining 40 symbols of thE surround channel audio data, that is, SW21 to SW60, are recorded in the twentieth data string R19, followed by the symbol level controller data Le0 to Le2.

FIGS. 8a to 8i, 9, 10a to 10i and 11 illustrate a compression processing block of audio data for the motion picture film according to another embodiment of the present invention. More specifically, FIGS. 8a to 8i and 9 correspond to the left channel of audio data of such compression processing block, whereas FIGS. 10a to 10i and 11 correspond to the right channel thereof. The left channel of audio data of the compression block will be initially described below, afterwhich the right channel thereof will be described.

Figure 9:
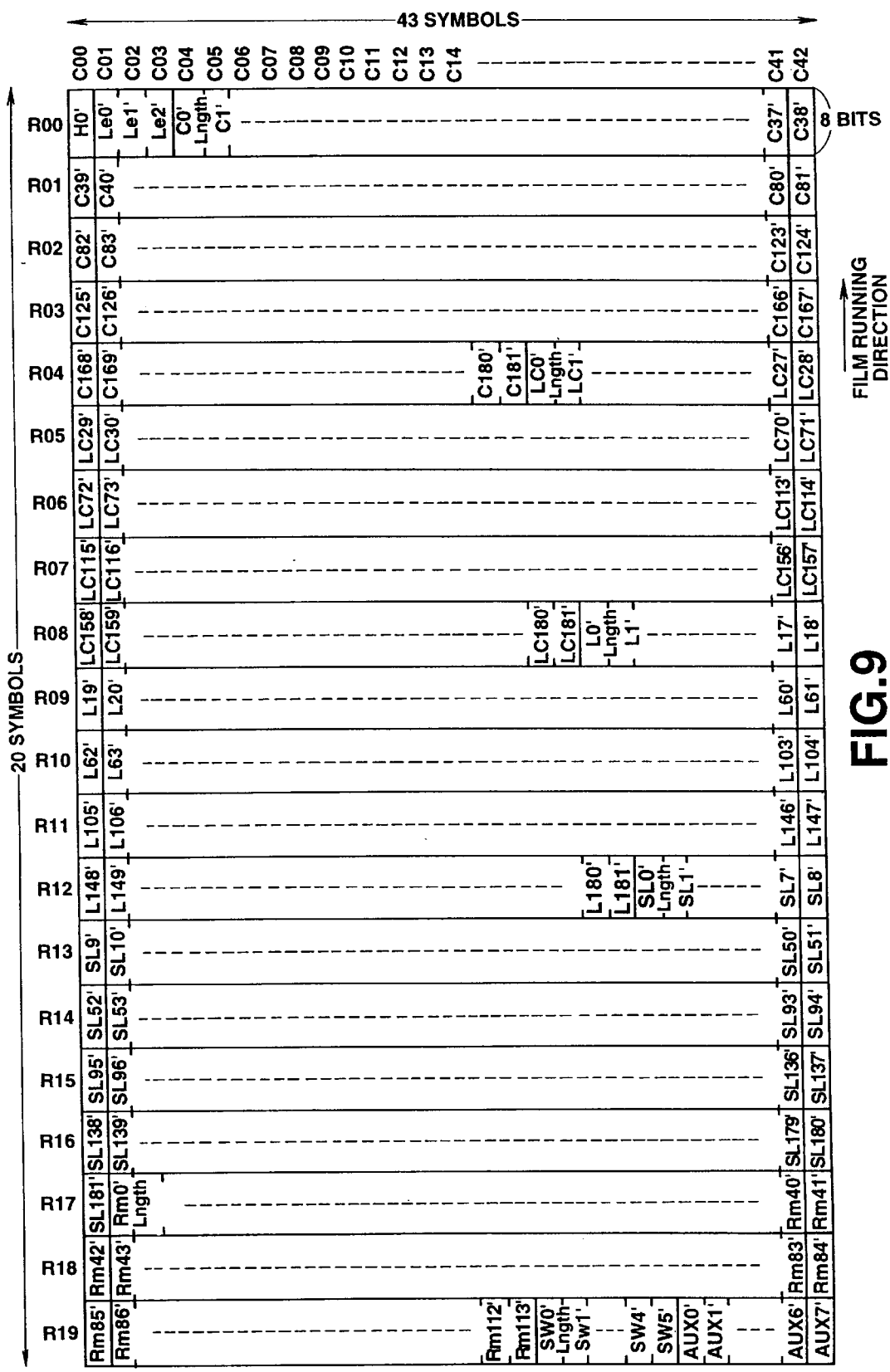
FIG. 9 illustrates the left channel of audio data of FIGS. 8a to 8i in a compression processing block of the motion picture film of FIG. 1.
Figure 10:
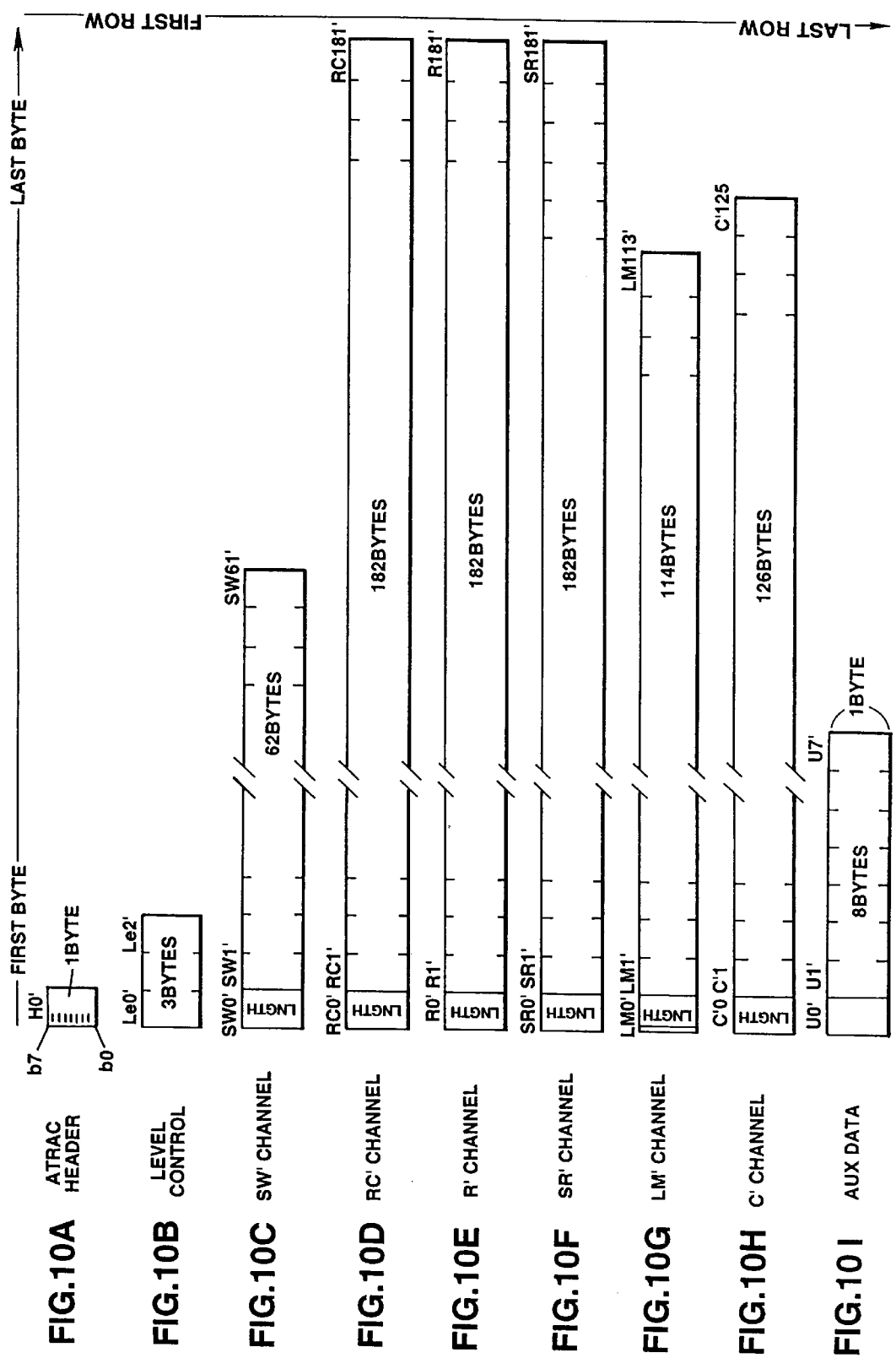
FIGS. 10a to 10i illustrate another arrangement of the right channel of audio data in a compression processing block of the motion picture film of FIG. 1 according to another embodiment of the present invention.

As shown in FIGS. 8a to 8i, recorded in the left channel audio data of each compression processing block is a 1-byte header H0' (FIG. 8a), 3 bytes of level controller data Le01' to Le2' (FIG. 8b), 182 bytes of center channel audio data C0' to C181' (FIG. 8c), 182 bytes of left center channel audio data LC0' to LC181' (FIG. 8d), 182 bytes of left channel audio data L0' to L181' (FIG. 8e), 182 bytes of surround left channel audio data SL0' to SL181' (FIG. 8f), 114 bytes of right mix channel audio data RM0' to RM118' (FIG. 8g), 6 bytes of subwoofer channel audio data SW'0 to SW'5 (FIG. 8h) and 8 bytes of auxiliary data U0' to U7' (FIG. 8i). Each byte of the level controller data respectively indicates the audio data level of one of the left channel, the left center channel and the surround left channel. Further, in a manner similar to that previously described, 1 byte=1 symbol=8 bits. Additionally, as indicated in FIG. 8a, each row of data includes 1 byte, or 8 bits (that is, bits b0 to b7), of data which are arranged in columns, that is, in the film running direction which is substantially perpendicular or normal to the direction of the rows. Thus, as shown in FIG. 9, each audio data of each left channel compression processing block is recorded symbol-by-symbol along the film running direction and such that one-symbol of audio data is adjacent to another in a direction normal (at right angles) to the film running direction. Such arrangement of audio data in this left channel compression processing block will now be described with reference to FIG. 9.

Each compression processing block includes the data previously described with reference to FIGS. 8a to 8i arranged in a plurality of rows or data strings, such as 20 data strings R00 to R19, in which each of these data strings includes a plurality of symbols of data, such as 43 symbols as shown in FIG. 9. More specifically, as shown therein, the 1 symbol of ATRAC header H0' is initially recorded in the first data string R00, followed by the 3 symbol level controller data Le0' to Le2' and 39 of the 182 symbols of the center channel audio data in this sequence. Forty-three symbols of the center channel audio data are each recorded in the second to fourth data strings R00 to R03, that is, the center channel audio data C39' to C81' is recorded in the data string R01, the data C82' to C124' is recorded in the data string R02, and the data C125' to C167' is recorded in the data string R03. The remaining 14 symbols of the center channel audio data, that is, data C168' to C181', is recorded in the fifth data string R04, followed by 29 of the 182 symbols of the left center channel audio data LC0' to LC28'. Forty-three symbols of the left center channel audio data are each recorded in the sixth to eighth data strings R05 to R07, that is, the left center channel audio data LC29' to LC71' is recorded in the data string R05, data LC72' to LC114' is recorded in the data string R06, and data LC115' to LC157' is recorded in the data string R07. The remaining 24 symbols of the left center channel audio data, that is, data LC158' to LC181', is recorded in the ninth data string R09, followed by 19 of the 182 symbols of the left channel audio data L0' to L18'. Forty-three symbols of the left channel audio data are each recorded in the tenth to twelfth data strings R9 to R11, that is, the left channel audio data L19' to L61' is recorded in the data string R09, data L62' to L104' is recorded in the data string R10, and data L105' to L147' is recorded in the data string R11. The remaining 34 symbols of the left channel audio data, that is, data L148' to L181', is recorded in the thirteenth data string R12, followed by 9 of the 182 symbols of the surround left channel audio data SL0' to SL8'. Forty-three symbols of the surround left channel audio data are each recorded in the fourteenth to seventeenth data strings R13 to R16, that is, the surround left channel audio data SL9' to SL51' is recorded in the data string R13, data SL52' to SL94' is recorded in the data string R14, data SL95' to SL137' is recorded in the data string R15, and data SL138' to SL180' is recorded in the data string R16. The remaining 1 symbol of the surround left channel audio data, that is, data SL181', is recorded in the eighteenth data string R17, followed by 42 of the 114 symbols of the right mix channel audio data RM0' to RM41'. Forty-three symbols of the right mix channel audio data, that is, data RM42' to RM84', are recorded in the nineteenth data string R18. The remaining 29 symbols of the right mix channel audio data, that is, data RM85' to RM113', is recorded in the twentieth data string R19, followed by the 6 symbols of the subwoofer channel audio data SW'0 to SW'5 and the 8 symbols of the auxiliary data AUX0' to AUX7'.

The right channel audio data of the compression processing block will now be described.

As shown in FIGS. 10a to 10i, recorded in the right channel audio data of each compression processing block are 1 byte of ATRAC header H0' (FIG. 10a), 3 bytes of level controller data Le0' to Le2' (FIG. 10b), 62 bytes of subwoofer channel audio data SW0' to SW61' (FIG. 10c), 182 bytes of right center channel audio data RC0' to RC181' (FIG. 10d), 182 bytes of right channel audio data R0' to R181' (FIG. 10e), 182 bytes of surround right channel audio data SR0' to SR181' (FIG. 10f), 113 bytes of left mix channel audio data LM0' to LM114' (FIG. 10g), 126 bytes of center channel audio data C0' to C125' (FIG. 10h) and 8 bytes of auxiliary data U0' to U7' (FIG. 10i). Each byte of the level controller data respectively indicates the audio data level of one of the right channel, the right center channel and the surround right channel.

Figure 11:
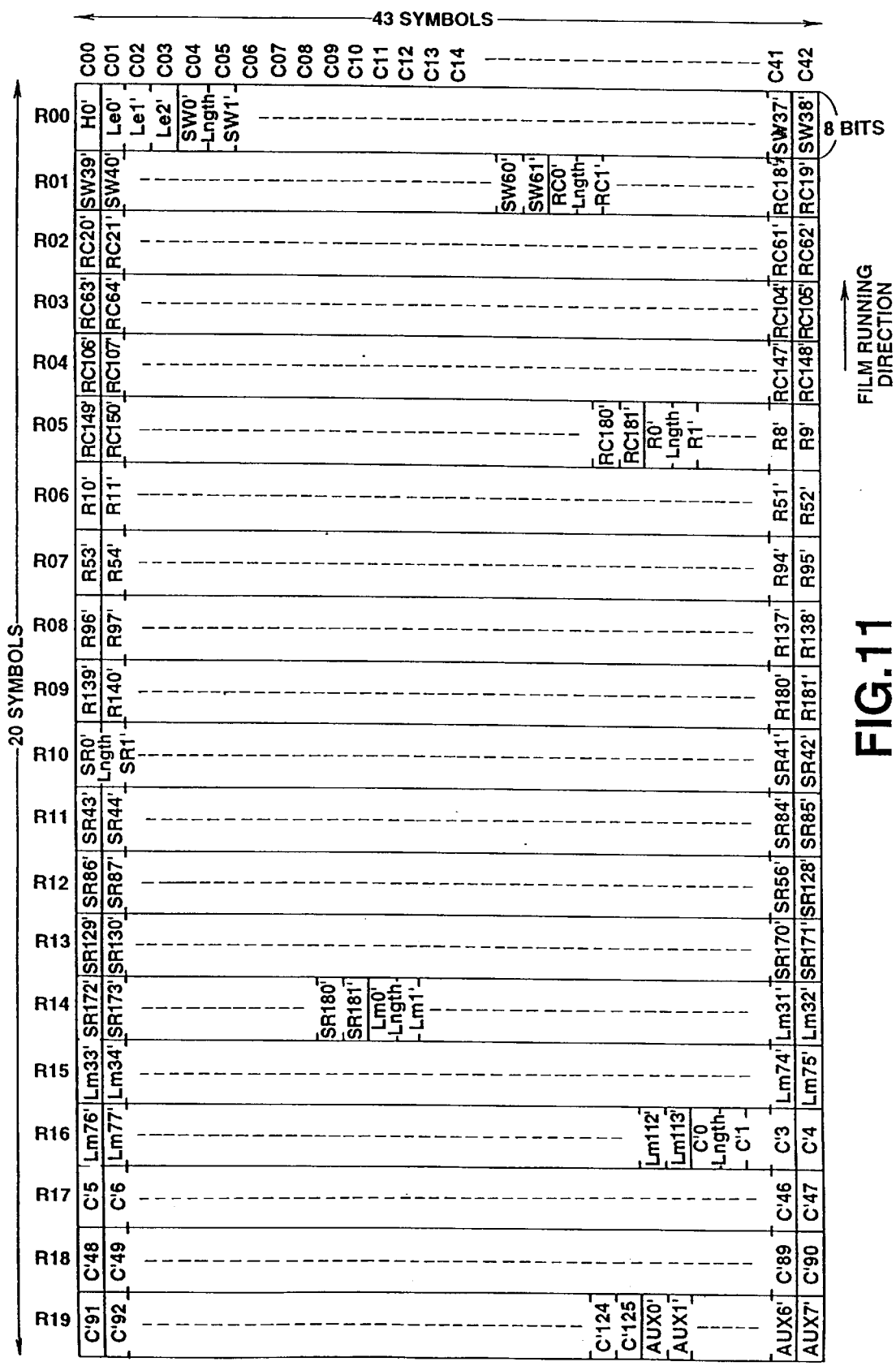
FIG. 11 illustrates the right channel of audio data of FIGS. 10a to 10i in a compression processing block of the motion picture film of FIG. 1.

Further, in a manner similar to that previously described with reference to the left channel, 1 byte=1 symbol=8 bits. Additionally, as indicated in FIG. 10a, each row of data includes 1 byte, or 8 bits (that is, bits b0 to b7), of data which are arranged in columns, that is, in the film running direction which is substantially perpendicular or normal to the direction of the rows. Thus, as shown in FIG. 11, each audio data of each right channel compression processing block is recorded symbol-by-symbol along the film running direction and such that one-symbol of audio data is adjacent to another in a direction normal (at right angles) to the film running direction. Such arrangement of audio data in this right channel compression processing block will now be described with reference to FIG. 11.

Each compression processing block includes the data previously described with reference to FIGS. 10a to 10i arranged in a plurality of rows or data strings, such as 20 data strings R00 to R19, in which each of these data strings includes a plurality of symbols of data, such as 43 symbols as shown in FIG. 11. More specifically, as shown therein, the 1 symbol of the header H0' is initially recorded in the first data string R00, followed by the 3 symbols of the header level controller data Le0' to Le2' and 39 of the 62 symbols of the subwoofer channel audio data, that is, data SW1' to SW38', in this sequence. The remaining 23 symbols of the subwoofer channel audio data, that is, the data SW39' to SW61', is recorded in the data string R01, followed by 20 of the 182 symbols right center channel audio data, that is, the data RC0' to RC19'. Forty-three symbols of the right center channel audio data are each recorded in the third to fifth data strings R02 to R04, that is, the right center channel audio data RC20' to RC62' is recorded in the data string R02, the data RC63' to RC105' is recorded in the data string R03, and the data RC106' to RC148' is recorded in the data string R04. The remaining 33 symbols of the right center channel audio data, that is, data RC149' to RC181', is recorded in the sixth data string R05, followed by 10 of the 182 symbols of the right channel audio data R0' to R9'. Forty-three symbols of the right channel audio data are each recorded in the seventh to tenth data strings R06 to R09, that is, the right channel audio data R10' to R52' is recorded in the data string R06, data R53' to R95' is recorded in the data string R07, data R96' to R138' is recorded in the data string R08, and data R139' to R181' is recorded in the data string R09. Forty-three symbols of the surround right channel audio data are each recorded in the eleventh to fourteenth data strings R10 to R13, that is, the surround right channel audio data SR0' to SR42' is recorded in the data string R10, data SR43' to SR85' is recorded in the data string R11, data SR86' to SR128' is recorded in the data string R12, and data SR129'to SR171' is recorded in the data string R13. The remaining 10 symbols of the surround right channel audio data, that is, data SR172' to SR181', is recorded in the fifteenth data string R14, followed by 33 of the 114 symbols of the left mix channel audio data LM0' to LM32'. Forty-three symbols of the left mix channel audio data LM33' to LM75' are recorded in the sixteenth data string R15. The remaining 38 symbols of the left mix channel audio data, that is, data LM76' to LM113', are recorded in the seventeenth data string R16, followed by 5 of the 126 symbols of the center channel audio data C'0 to C'4. Forty-three symbols of the center channel audio data are each recorded in the eighteen and nineteenth data strings R17 and R18, that is, the center channel audio data C'5 to C'47 is recorded in the data string R17 and data C'48 to C'90 is recorded in the data string R18. The remaining 35 symbols of the center channel audio data, that is, data C'91 to C'125, are recorded in the twentieth data string R19, followed by 3 symbols of the auxiliary data AUX0' to AUX7'.

Upon comparing the embodiment illustrated in FIGS. 4–7 with the embodiment illustrated in FIGS. 8–11, it may be observed that the subwoofer channel audio data in the latter-described embodiment are repeatedly recorded in the digital sound tracks. Though the 61-bytes SW channel data is compressed to 6-bytes SW' channel data, it may be possible to recover the subwoofer audio signal even though the 61-bytes SW channel data is lost due to scratches on the film or a long burst signal.

Figure 12:
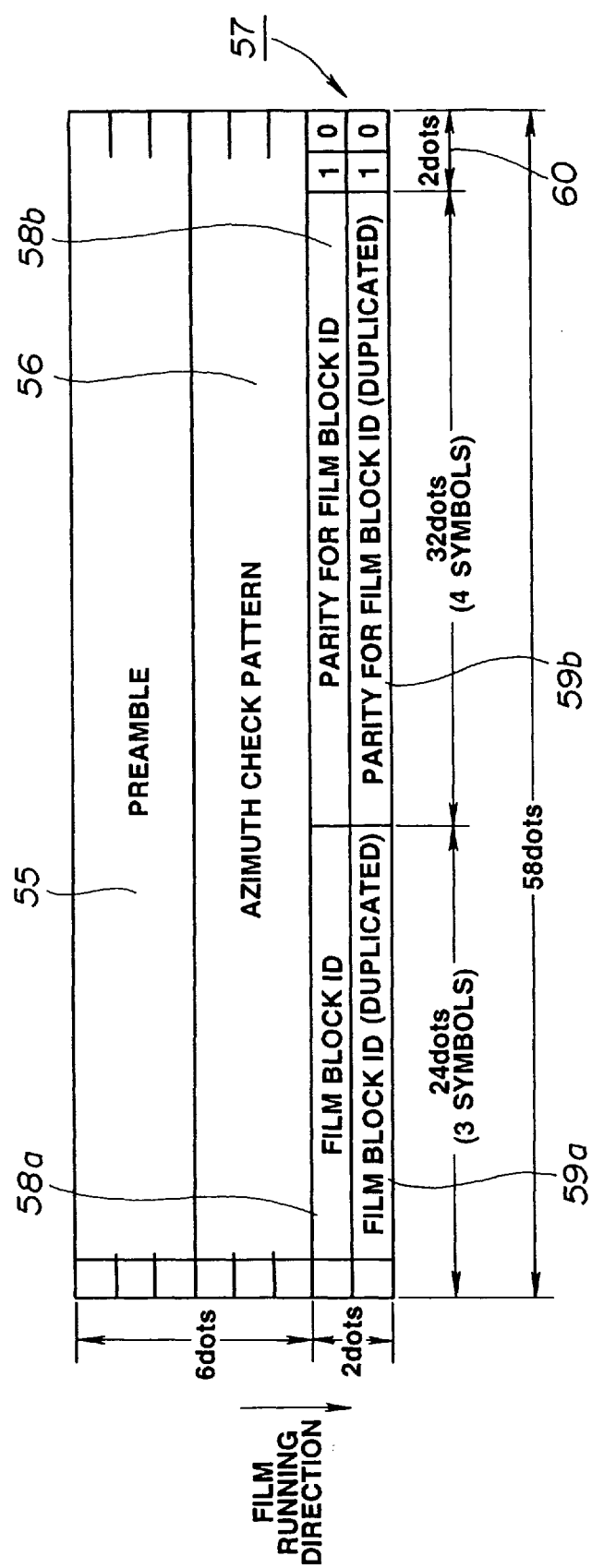
FIG. 12 illustrates the leading end data recorded at the leading end of the compression processing block.

Leading end data, such as that shown in FIG. 12, may be recorded in each of the above-described compression processing block having respective audio data. More specifically, as shown in FIG. 12, the leading end data includes a preamble 55 having 58 dots in a direction substantially normal or at a right angle to the film running direction and 3 dots in the film running direction; an azimuth check pattern 56 having 58 dots in the normal direction to the film running direction and 3 dots in the film running direction; and a block identification (block ID) number 57 having 58 dots in the normal direction to the film running direction and 2 dots in the film running direction.

Recorded in the block ID 57 is a film identification number 58a having 24 dots in the direction normal to the film running direction and 1 dot in the film running direction, a parity for the film block identification number 58b having 32 dots in the direction normal to the film running direction and 1 dot extending along the film running direction which is located adjacent to the film block identification number 58a, a 2-dot reserve 60 in the direction normal to the film running direction which is located adjacent to the parity 58b. Further recorded in the block ID 57 is a film block identification number 59a having substantially the same data as that of the film block identification number 58a and which has 24 dots in the direction normal to the film running direction and 1 dot in the film running direction, a parity 59b for the film block identification number 59a having 32 dots in a direction normal to the film running direction and 1 dot in the film running direction which is located adjacent to the film identification number 59a, and a reserve 60 having 2 dots in the direction normal to the film running direction and located adjacent to the parity 59b.

Figure 13:
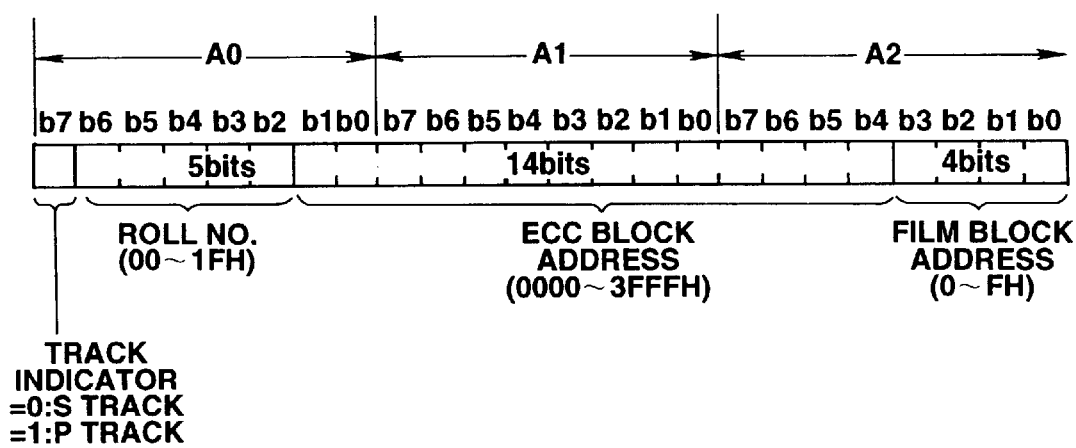
FIG. 13 illustrates data recorded in a block ID portion of the leading end data of FIG. 12.

A 1-bit track indicator, a 5-bit roll number, a 14-bit ECC block address and a 4-bit film block address are recorded in the film block identification number 58a as shown in FIG. 13. As shown therein, "A0", "A1" and "A2" each respectively represent one symbol (8 bits) of data. The track indicator may have a value of "0" or "1", depending on whether the respective film block identification number represents a right or left channel audio data. (The right-route channel data is recorded in an S track, while the left-route channel data is recorded in a P track.) The roll number includes the motion picture film number. The ECC block address includes the address of the C1 parity and the C2 parity for the compression processing block. The film block address includes the address of the film block.

Figure 14:
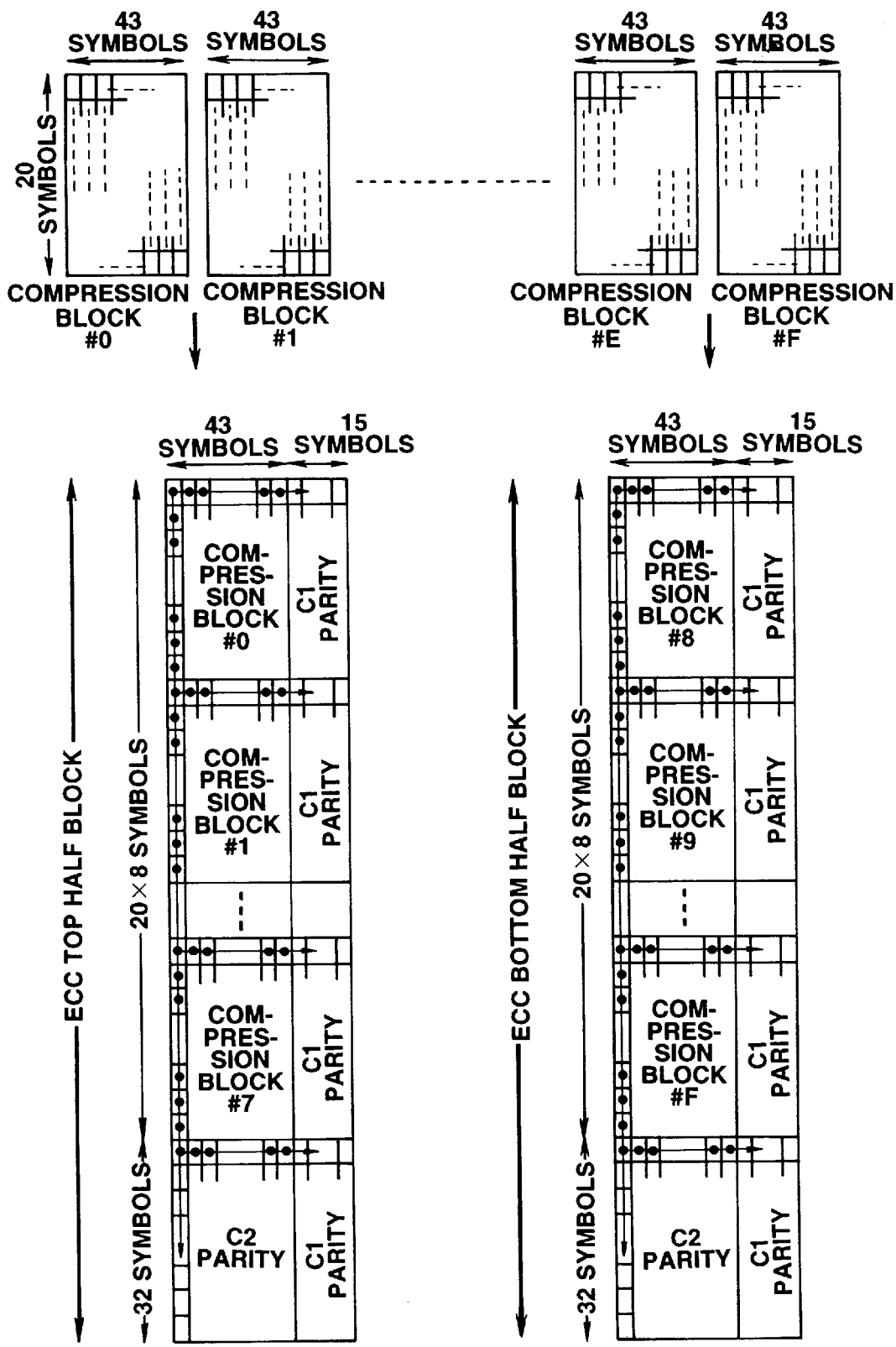
FIG. 14 illustrates an arrangement of C1 parity data appended to each compression block and C2 parity data appended after an interval of plural compression blocks.

A 15 symbol C1 parity is added or appended to the 43 symbol audio data of the compression processing block as, for example, shown in FIG. 14. Further, C2 parity is added after a predetermined number of compression processing blocks. For example, 32 symbols of C2 parity may be added after eight compression processing blocks #0 to #7 (20 symbols×8 symbols=160 symbols) which are an ECC top half block, and 32 symbols of C2 parity may be added after the 9th to 16th compression processing blocks (that is, no. 8 to no. F) (20 symbols×8 symbols=160 symbols) which are an ECC bottom half block, as shown in FIG. 14. Added to the C2 parity of each block is a 15-symbol C1 parity.

An ECC full block is illustrated in FIG. 15. As shown therein, such ECC full block includes an ECC top half block and an ECC bottom half block each having 15 symbols of C1 parity and 32 symbols of C2 parity arranged as previously described. As a result, each of these ECC top half and bottom half blocks include 192 symbols. Such data may be interleaved in a predetermined manner. For example, each symbol of audio data T000 to T191 of the ECC top half block and each symbol of audio data B000 to B191 of the ECC bottom half block B000 to B191 may be rearranged or interleaved as shown in FIG. 15b so as to form 16 film blocks each having 24 symbols. More specifically, the 0th film block no. 0 may be formed by sequentially arranging the 0th symbol T000 from the ECC top half block, the 0th symbol B000 from the ECC bottom half block, the first symbol T001 from the ECC top half block, the first symbol B001 from the ECC bottom half block, . . . the 10th symbol T010 from the ECC top half block, the 10th symbol B010 from the ECC bottom half block, the 11th symbol T011 from the ECC top half block, and the 11th symbol B011 from the ECC bottom half block, as shown in FIG. 15b. Similarly, the first film block no. 1 may be formed by sequentially arranging the 12th symbol T012 from the ECC top half block, the 12th symbol B012 from the ECC bottom half block, the 13th symbol T013 from the ECC top half block, the 13th symbol B013 from the ECC bottom half block, . . . the 23rd symbol T023 from the ECC top half block, and the 23rd symbol B023 from the ECC bottom half block. The second to 15th film blocks nos. 2 to 15 may be formed in a similar manner.

Figure 16:
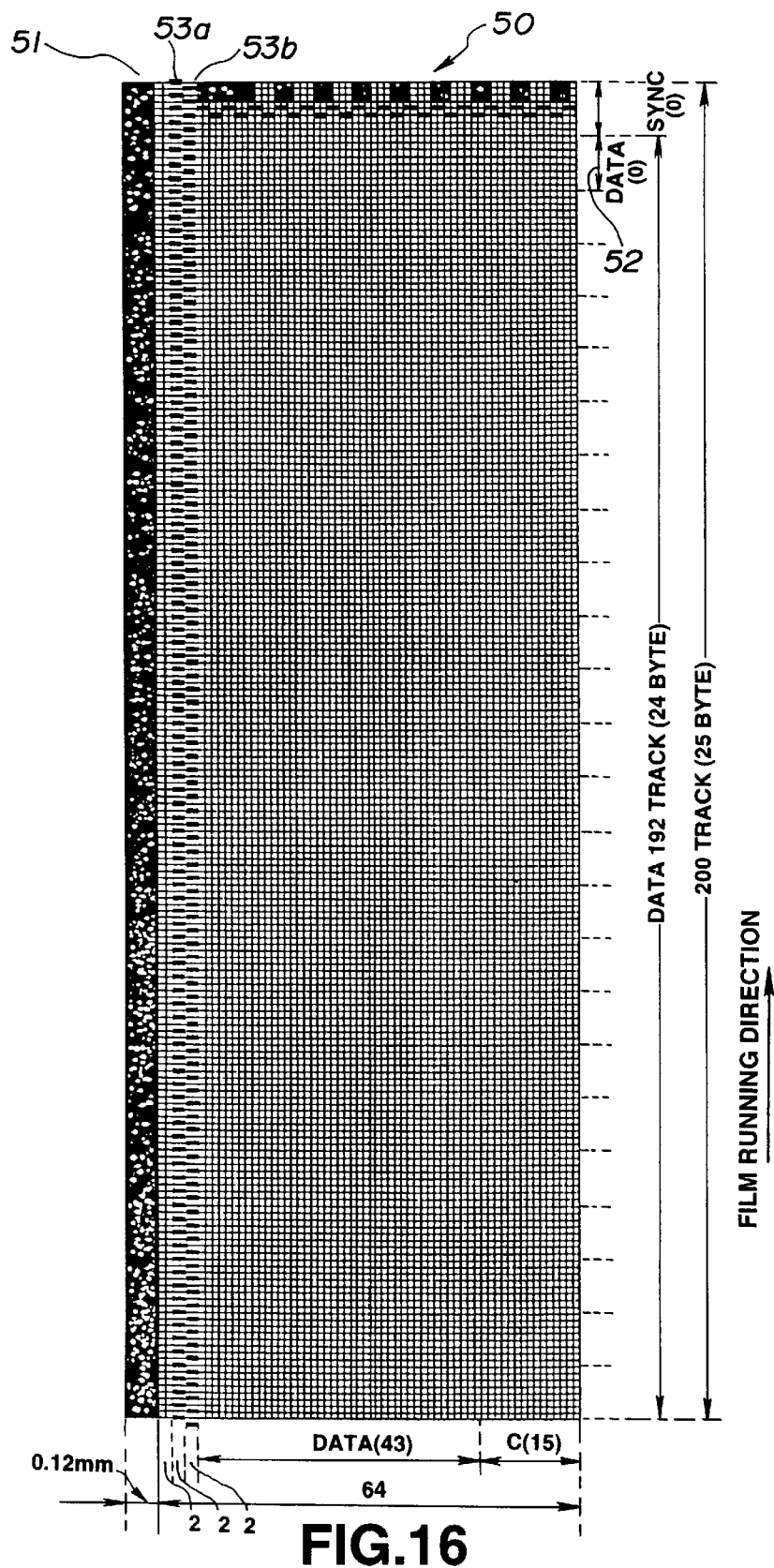
FIG. 16 illustrates the manner in which film blocks formed by interleaving may be recorded on the motion picture film of FIG. 1.

The film blocks are formed by the above-described interleaving, and the right and left channel digital sound tracks are recorded on a channel-by-channel basis. More specifically, audio data may be recorded in each film block in the digital sound tracks as shown in FIG. 16. That is, recorded in such film blocks are the leading end data 50, light-barrier regions 51 which extend on one side of the digital sound tracks in the film running direction and which may have a width of approximately of 0.12 mm, the audio data, C1 parity and C2 parity which extend in a direction normal to the film running direction and in a side-by-side relation to the film running direction, and stripe-shaped tracking patterns 53a and 53b which extend in the film running direction and which are located adjacent to the light barrier regions 51, as shown in FIG. 16. The tracking patterns 53a and 53b may be a white/black repeat pattern having a predetermined repeat interval, such as an interval of one dot, in the film running direction. Such tracking patterns 53 and 53b may be recorded with a one dot offset in the film running direction as shown in FIG. 16. Further, 1-byte (8 bits) of data 52 extends in a film running direction. In other words, 1-byte of audio data of any channel, such as that shown in FIGS. 5, 7, 9 and 11, is aligned along the film running direction. Such arrangement improves the quality of the audio reproductions. That is, the ability for performing error correction does not change when a 1 bit error or 8 bits of error occur in a 1-byte of data in an error correction system utilizing a predetermined coding technique, such as Reed-Solomon coding or the like, in which error correction may be performed with a 1-byte (8 bits) unit. Such arrangement may be disadvantageous if the 1-byte allocation is aligned or arranged in a direction normal to the scratches. However, as previously described, longitudinal scratches typically occur more frequently than transverse scratches on motion picture film as the film is repeatedly reproduced. Therefore, by arranging the data in a one byte arrangement in-line with the film running direction as previously described, the present invention may relatively easily correct or compensate for errors caused by the more frequently occurring type of scratches, that is, longitudinal scratches.

Figure 17:
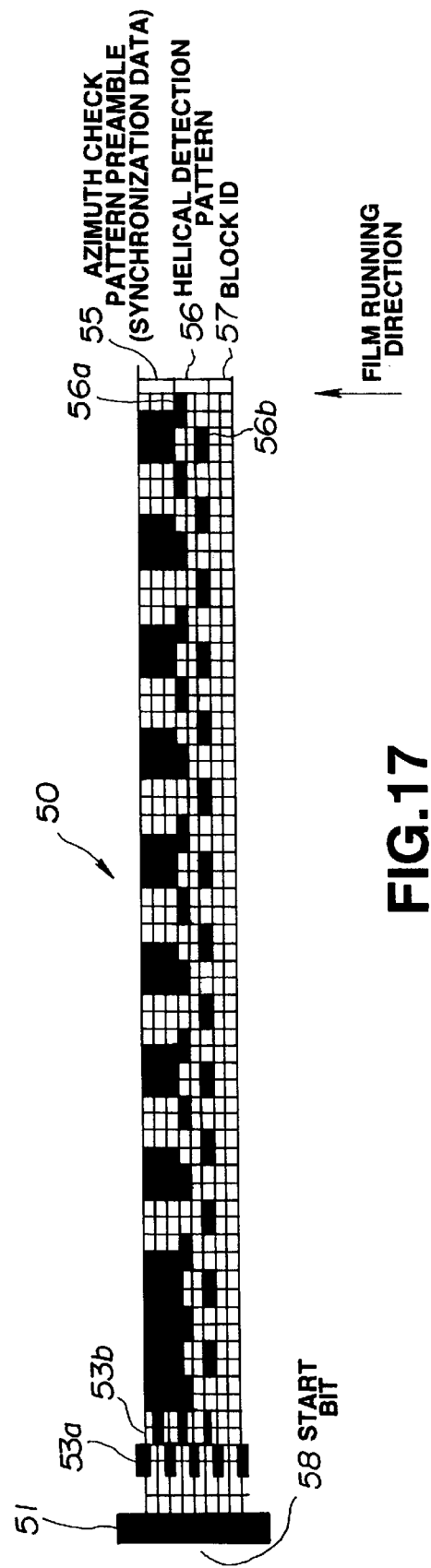
FIG. 17 illustrates the leading end data recorded on the motion picture film.

FIG. 17 illustrates a pattern of the leading end data 50. As shown therein, the preamble 55 is recorded as three dots in the film running direction. A black and white repeat pattern extends at right angles to the film running direction. The azimuth check pattern 56 includes a 2-dot white/black repeat pattern 56a recorded in a direction normal to the film running direction and a 2-dot white/black repeat pattern 56b recorded with an offset of 2 dots in a direction normal to the film running direction with respect to the repeat pattern 56a. Thereafter, the block ID57 is recorded.

Figure 18:
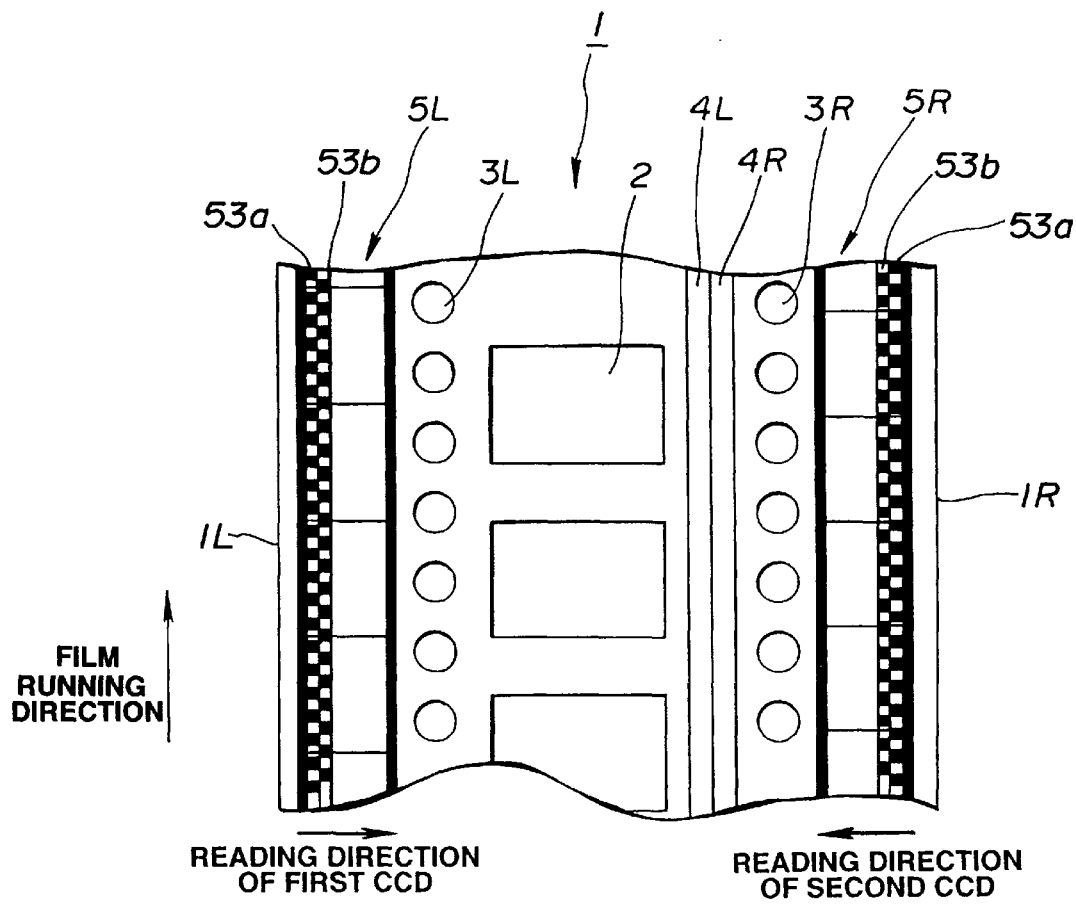
FIG. 18 illustrates film blocks symmetrically recorded on the right-channel digital sound track and the left-channel digital sound track of the motion picture film of FIG. 1.

The above-described film block may be symmetrically recorded in the right channel digital sound track 5R and the left channel digital sound track 5L of the motion picture film of the present invention. As shown in FIG. 18, the tracking patterns 53a and 53b of the left channel digital sound track 5L are recorded adjacent to the left edge 1L of the film 1, while the tracking patterns 53a' and 53b' of the right channel digital sound track 5R are recorded adjacent to the right edge 1R of the film 1. During reproduction, the left channel digital sound track 5L is read from the left edge 1L of the film 1, while the right channel digital sound track 5R is read from the right edge 1R of the film 1.

Figure 19:
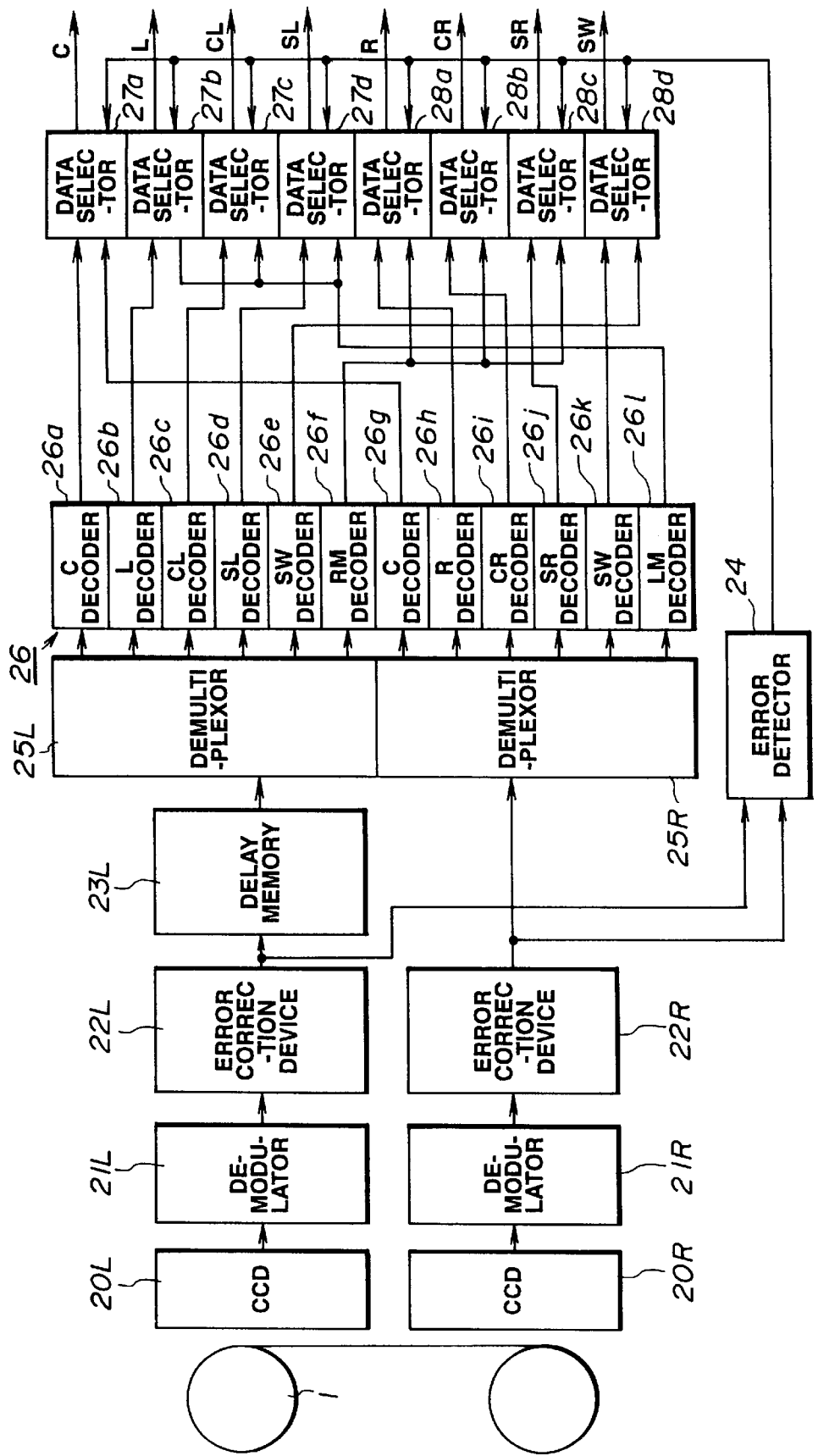
FIG. 19 is a block diagram showing a reproducing apparatus for the motion picture film of FIG. 1 according to an embodiment of the present invention.

A motion picture film reproducing apparatus for reproducing audio data from the motion picture film 1 is illustrated in FIG. 19. Such reproducing apparatus includes first and second CCD line sensors 20L and 20R, demodulators 21L and 21R, error correction devices 22L and 22R, a delay memory 23L, an error detector 24, demultiplexers 25L and 25R, a plurality of decoders 26a–26l, and a plurality of data selectors 27a–27d and 28a–28d which are connected as shown in FIG. 19. Left route audio data may be read by the first CCD line sensor 20L and supplied to the demodulator 21L so as to be demodulated. Similarly, the right route audio data may be read by the second CCD line sensor 20R and supplied to the demodulator 21R so as to be demodulated. Outputs from the demodulators 21L and 21R are respectively supplied to the error correction devices 22L and 22R whereupon error-correction on the left-route audio data and right-route audio data are performed. An error corrected output signal from the error correction device 22L is supplied to the error detector 24 and to the delay memory 23L which is adapted to delay such signal by a predetermined amount and to supply an output therefrom to the demultiplexer 25L. An error corrected output signal from the error correction device 22R is supplied to the error detector 24 and to the demultiplexer 25R. The error flag detector 24 is adapted to detect an error flag which may be generated by the error correction devices 22L and/or 22R if the error correcting circuits could not perform error correction. The demultiplexer 25L is adapted to receive a series signal from the delay memory 23L and to generate therefrom the left-route audio data in parallel. Similarly, the demultiplexer 25R receives a series signal from the error correction device 22R and generates therefrom the right-route audio data in parallel. Parallel output signals from the demultiplexers 25L and 25R are respectively supplied to the decoders 26a–26f and 26g–26l, whereupon the left and right route audio data is decoded. output signals from the decoders 26a–26l are supplied to the data selectors 27a–27d and 28a–28d which also receive a detection output signal from the error detector 24. The data selectors 27a–27d are adapted to select and output therefrom left-route audio data based on the detection output of the error detection circuit 24. Similarly, the data selectors 28a–28d select and output right-route audio data based on the detection output of the error detection circuit 24.

The operation of the above-described motion picture film reproducing apparatus will now be described.

Upon initiating reproduction, the CCD line sensor 20L and the CCD line sensor 20R read the audio data recorded on the digital sound tracks 5L and 5R. More specifically, the CCD line sensor 20L reads out the left route audio data line by line towards the picture region 2 from the left edge 1L in a direction normal or at right angles to the film running direction (see FIG. 18) and supplies the read data to the demodulator 21L. Similarly, the CCD line sensor 20R reads out the right route audio data line by line towards the picture region 2 from the right edge 1R in a direction at right angles to the film running direction (see FIG. 18) and supplies the read data to the demodulator 21R.

As previously described, tracking patterns or like data are recorded in each of the digital sound tracks 5L and 5R and the CCD line sensors 20L and 20R respectively read out data from the film edges 1L and 1R. As a result, data such as the tracking patterns may be read without being obstructed by the perforations 3L and 3R in order to assure correct data reproduction.

As is to be appreciated, if tracking patterns are recorded on both sides of each data track, tracking error correction capability may be increased. However, in such situation, the audio data recording region is reduced since the tracking patterns are provided on both sides of the data tracks. Accordingly, the tracking patterns 53a and 53b are preferably provided only at one side of the digital sound tracks 5L and 5R so that a relatively wider audio data recording region may be obtained thereby increasing the amount of audio data which may be recorded as compared to the situation in which tracking patterns are recorded on both sides. However, the present invention is not so limited and, alternatively, tracking patterns may be provided on both sides of the digital sound tracks 5L and 5R.

The demodulators 21L and 21R respectively demodulate the left and right route audio data and supply the demodulated data to the error correction circuits 21L and 22R. The error correction circuit 22L performs error correction on the left route audio data by utilizing the C1 parity and C2 parity. The error correction circuit 22L forms an error flag if such error correction cannot be performed and provides such error flag to the error correction circuit 24. The error correction circuit 22L provides error-corrected data to the delay memory 23. Similarly, the error correction circuit 22R performs error correction on the right route audio data using the C1 parity and C2 parity and provides the error-corrected data to the demultiplexer 25R while forming an error flag if such correction cannot be performed and provides the error flag to the error correction circuit 24.

As previously described, scratches, such as longitudinal scratches extending in the film running direction and transverse scratches extending at right angles to the film running direction, may be generated on the motion picture film 1. Longitudinal scratches tend to be produced more frequently than the transverse scratches as the film 1 is used repeatedly. As a result, if the audio data is recorded in a direction at right angles to the film running direction on the digital sound tracks of the motion picture film, audio data may be destroyed for several lines by the longitudinal scratches. However, since each audio data of the present invention is recorded at an interval of a predetermined amount such as 1 byte along the film running direction, as described above, and the byte-based audio data is recorded side-by-side in a direction at right angles to the film ruining direction, longitudinal scratch may destroy only a minimum quantity of audio data, such as one byte. Accordingly, longitudinal scratches, which occur more frequently with the repeated use of the film 1, can be coped with successfully. Further, error correction in a direction at right angles to the film running direction and error correction for the longitudinal scratches can be performed by utilizing the C1 parity. Furthermore, error corrections utilizing the C2 parity may be performed for correcting errors caused by transverse scratches or hardly read out data when defocusing. As a result, the audio data from the motion picture film 1 may be properly reproduced therefrom by use of the present motion picture reproducing apparatus.

Figure 20:
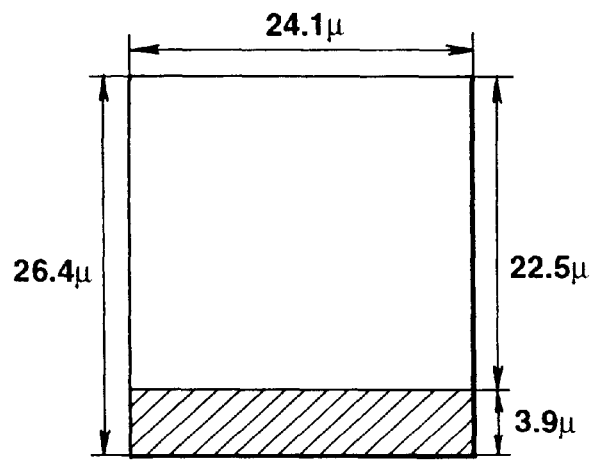
FIG. 20 is a diagram illustrating the size of an audio data dot recorded on the motion picture film of FIG. 1.
Figure 21:
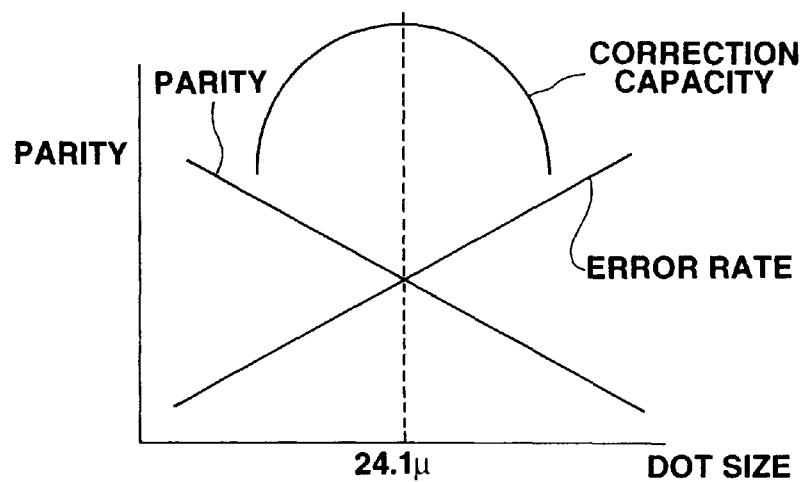
FIG. 21 is a graph to which reference will be made in explaining the relationship between the dot size and error correction capability.
Figure 22:
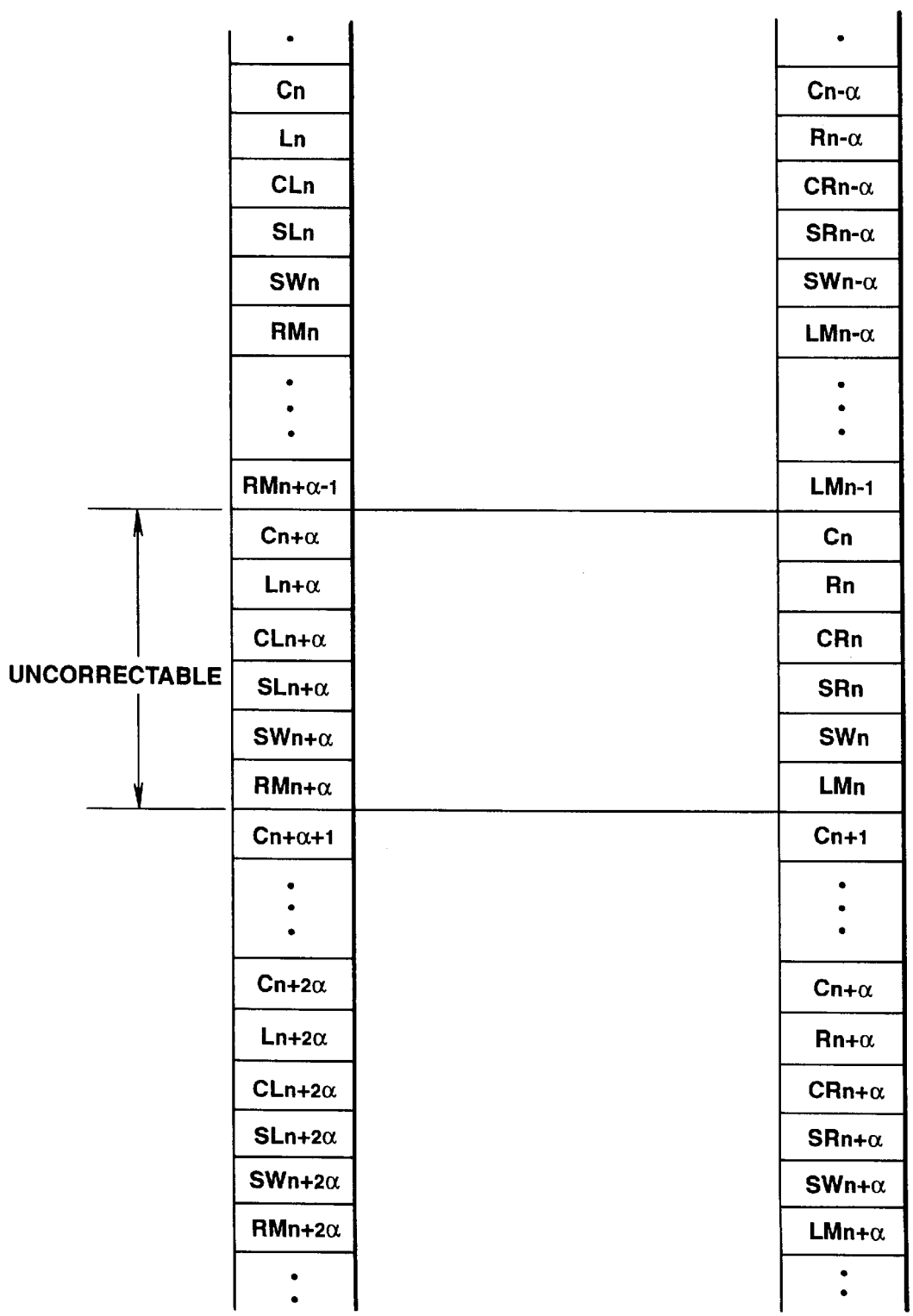
FIG. 22 is a diagram to which reference will be made in explaining a pre-set shift between the right channel and the left channel of the audio data recorded in the motion picture film of FIG. 1.

The audio data recorded on the motion picture film 1 has a predetermined size. More specifically, an audio data dot may have a size of 26.4$\mu$×24.1$\mu$ as, for example, shown in FIG. 20. The relationship between the dot size and the parity may be as shown in FIG. 21, wherein it is observed that as the dot size increases, the error rate becomes improved, and when the dot size is reduced, more parity data is appended or added. As further shown in FIG. 20, the error correction capability may be represented by a quadratic curve with the transverse dot size of 24.1$\mu$ as an apex. As a result, since the present invention records audio data dots having a size of 26.4$\mu$×24.1$\mu$, which size corresponds to the maximum error correcting capability, accurate reproduction of the audio data is facilitated.

The left-route and right-route audio data recorded on the motion picture film 1 are recorded with a shift of 17.8 frames, as previously described. Accordingly, the delay memory 23 (FIG. 19) delays the left-route audio data by a time period corresponding to 17.8 frames so as to match the timing thereof with the right route audio data. The resulting delayed data is serially supplied to the demultiplexer 25L which forms therefrom the center channel audio data C, left channel audio data L, center left channel audio data CL, left surround audio data SL, sub-woofer audio data SW and right mix channel audio data RM, and supplies the resulting data to the decoders 26a to 26f.

The demultiplexer 25R serially receives the right route audio data from the error correction device 22R which forms therefrom the center channel audio data C, right channel audio data R, center right channel audio data CR, right surround audio data SR, sub-woofer audio data SW and left mix channel audio data LM, and supplies the resulting data to the decoders 26g to 26l.

The decoders 26a to 26d decode the left route audio data C, L, CL and SL with high efficiency decoding and respectively supply the resulting decoded data to the left route data selectors 27a to 27d. The decoder 26e decodes the left route audio data SW with high efficiency decoding and supplies the resulting data to the right route data selector 28d. The decoder 26f decodes the left route audio data RM with high efficiency decoding and supplies the resulting data to the right route data selectors 28a to 28c. The decoder 26g decodes the right route audio data C with high efficiency decoding and provides the resulting data to the right route data selector 27a. The decoders 26h to 26k respectively decode the right route audio data R, CR, SR and SW with high efficiency decoding and supply the resulting decoded data to the right route data selectors 28a to 28d. The decoder 261 decodes the right route audio data RM with high efficiency decoding and supplies the resulting data to the data selectors 27b to 27d.

The data selectors 27a–27d and 28a–28d further receive the detection output of the error detection circuit 24. Based upon such detection output, the data selectors 27a–27d and 28a–28d may detect or determine the data which had not been error corrected. The data selectors 27a–27d and 28a–28d are each supplied with two audio data as previously described and are adapted to selectively output data other than the data which had not been error corrected.

In other words, the data selector 27a selectively outputs the center channel audio data of the left or right routes which had been error corrected. The data selector 27b selectively outputs the left channel audio data or the left mix channel audio signals which had been error corrected. The data selector 27c selectively outputs the left center channel audio data or the left mix channel audio data which had been error corrected. These data selector 27d selectively outputs the left surround audio data or the left mix channel audio data which had been error corrected. The data selector 28a selectively outputs the right channel audio data or the right mix channel audio data which had been error corrected. The data selector 28b selectively outputs the center right channel audio data or the right mix channel audio signals which had been error corrected. The data selector 28c selectively outputs the right surround audio data or the right mix channel audio data which had been error corrected. The data selector 28d selectively outputs the sub-woofer channel audio data which had been error corrected.

If both of the data signals supplied to any of the data selectors 27a–27d and 28a–28d are valid (for example, both such signals had been error corrected), the respective data selector selects a desired one of the data signals based on predetermined arrangement and supplies such selected signal therefrom. If, however, neither of the data signals supplied to any of the data selectors is valid, the respective data selector(s) does not supply an output data signal therefrom.

The right mix channel audio data RMn, which is produced or mixed from the right channel R, center right channel CR and the surround right channel SR, is recorded on the left channel digital sound track 5L along with the left route audio data SLn, Ln and CLn. The left mix channel audio data LMn, which is produced or mixed from the left channel L, center left channel CL and the surround left channel SL, is recorded on the left channel digital sound track 5L along with the right route audio data SRn, Rn and CRn. The audio data of the respective channels of the digital sound rack 5R are recorded thereon with a time difference as compared to the audio data of the respective channels recorded on the digital sound track 5L. As a result, even if a relatively long error burst is produced in one of the digital sound tracks, such as 5L, and there is an error on the opposite side digital sound track 5R, left channel audio data, that is, mixed audio data LMn mixed from the audio data L, CLn and SLn, may be reproduced whereupon left route signals may be generated therefrom.

Suppose that, for example, scratches are produced due to hand-cut editing of the film in the horizontal direction such that the frames Cn+$\alpha$, Ln+$\alpha$, CLn+$\alpha$, SLn+$\alpha$, SWn+$\alpha$ and RMn+$\alpha$ on the left route, and the frames Cn, Rn, CRn, SRn, SWn and LMn on the right route are uncorrectable so as to be unreproducible. In this situation, the data at the position (n) of the time sequence of the right route has already been reproduced by the left route, so that sound reproduction may be possible at the position (n) in the time sequence by using such left route data. On thus other hand, sound reproduction for data at the position (n+α) in the time sequence may be obtained at the position (n+α) in the time sequence by the data recorded in the right route.

By such dual recording of audio data of predetermined and presumably crucial channels, the audio data may be reproduced even if one of the decoders did not supply a proper decoded signal, if another of the decoders properly decoded and supplied therefrom the correctly decoded signal. Accordingly, a sound field may be effectively reproduced without sound interruption.

Figure 23:
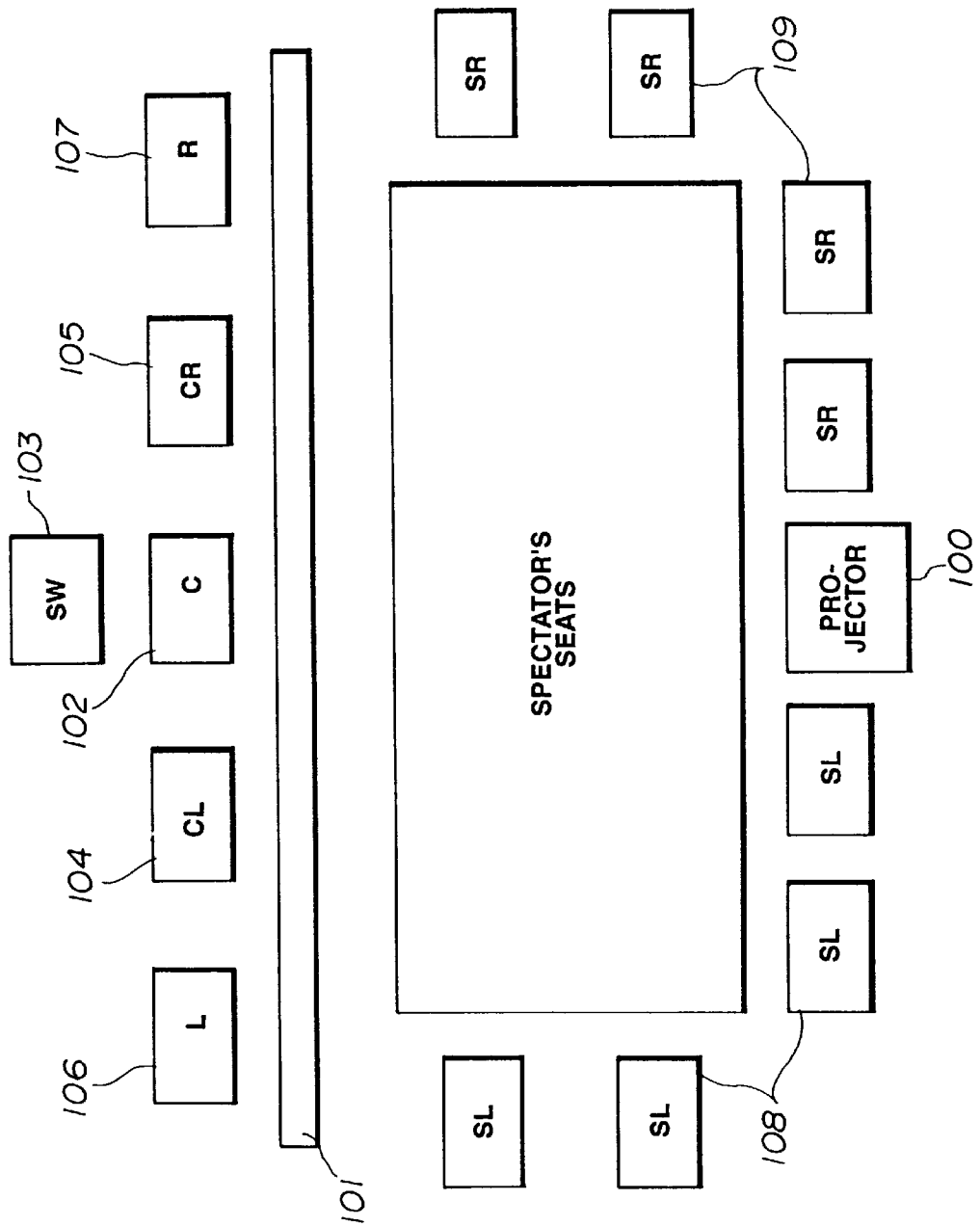
FIG. 23 illustrates a speaker arrangement for receiving audio data recorded on the motion picture film of FIG. 1.

The 8-channels of audio data reproduced by the present reproducing apparatus includes six-channels of audio data which may be supplied to a center speaker 102, a sub-woofer 103, a center left speaker 104, a center right speaker 105, a left speaker 106 and a right speaker 107, which are arranged on the side of a projection screen upon which a picture reproduced from the picture recording area 2 of the motion picture film 1 is projected by a projector 100, as shown in FIG. 23. Such 8-channels of audio data further include two-channels of audio data which may be supplied to one or more surround right speakers 109 and to one or more surround left speakers 108, which are arranged on the side of the projector 100 as shown, for example, in FIG. 23. A sound field rich in ambience may be reproduced by the eight channels of digital sound supplied through the speakers 102 to 109.

The above-described speakers and the playback sounds produced thereby will now be more fully described.

The center speaker 102 is arranged at a center position of the screen 101 and outputs the playback sound of the audio data C of the center channel. Such playback sound includes relatively important or crucial playback sounds, such as the dialogues of the actors or actresses.

The sub-woofer 103 outputs the playback sound of the audio data SW of the sub-woofer channel. Such playback sound may be perceived as vibrations, rather than low-range sound, such as that caused by an explosion. Accordingly, the sub-woofer may be utilized frequently in a scene having explosions so as to provide outstanding sound effects.

The left speaker 106 and the right speaker 107 are arranged on the left and right sides of the screen 101, respectively. Such speakers respectively output the playback sound of the left-channel audio data L and the playback sound of the right-channel audio data R with stereophonic effects.

The center left speaker 104 and the center right speaker 105 are respectively arranged between the center speaker 102 and the left speaker 106 and between the center speaker 102 and the right speaker 107. The speakers 104 and 105 respectively output the playback sound of the center left channel auidio data CL and the playback sound of the center right channel audio data CR so as to assist the left speaker 106 and the right speaker 107. In a motion picture theater having a relatively large-format screen and capable of holding a relatively large number of guests, the fixed position feeling of the sound image may become unstable depending on the seat position. A more realistic fixed-position feeling of the sound image may be effectively created by adding the center left speaker 104 and the center right speaker 105.

The surround left speakers 108 and the surround right speakers 109 are arranged so as to surround the guest or spectator's seats and respectively output the playback sound of the audio data SL of the surround left channel and the playback sound of the audio data SR of the surround right channel. As a result, the spectator(s) may have the impression that they are encircled by reverberating sound. This creates a more stereophonic sound image.

Figure 24:
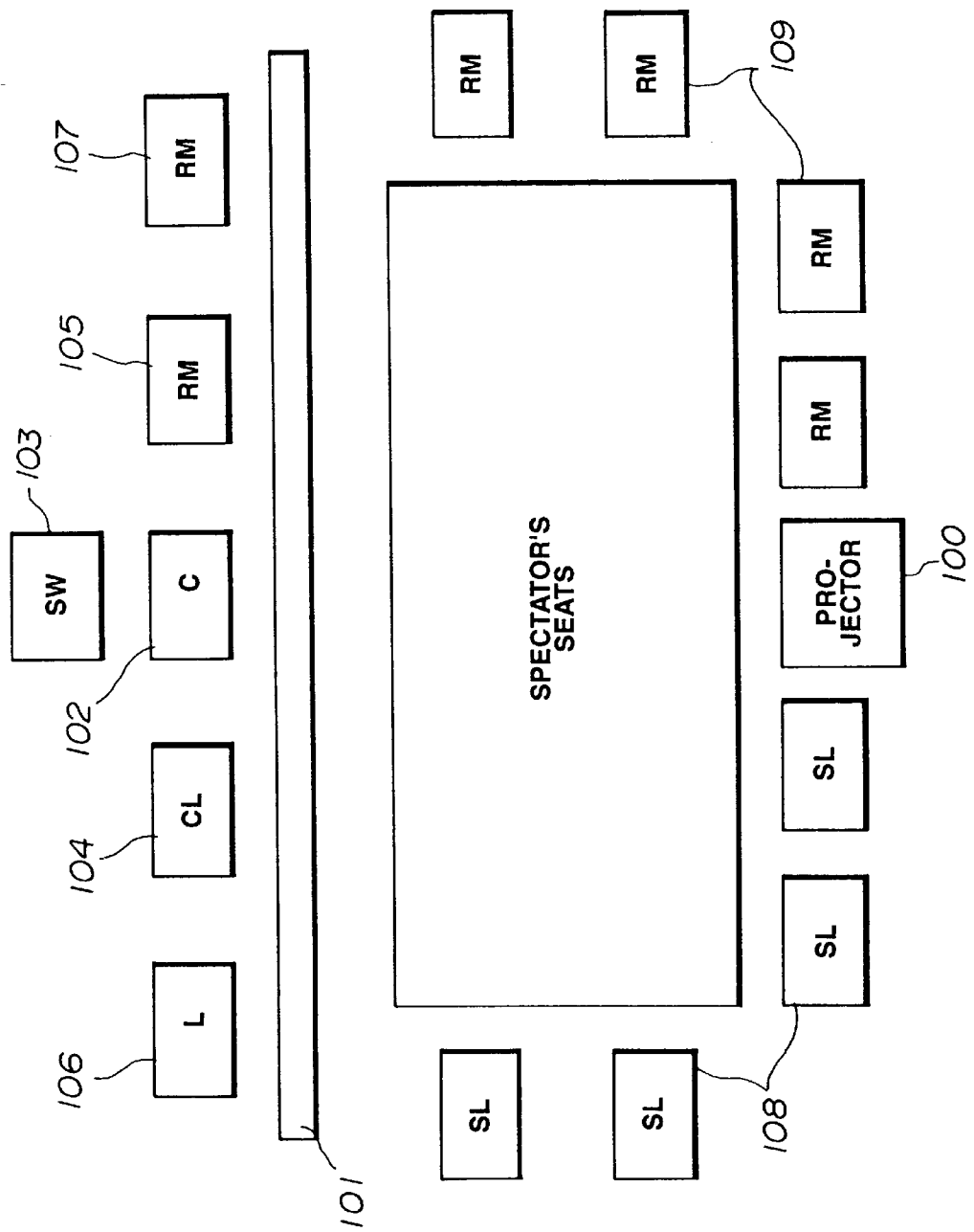
FIG. 24 illustrates another speaker arrangement for receiving audio data recorded on the motion picture film of FIG. 1.

Suppose, for example, that only audio data of the left digital sound track is reproduced. Such situation is illustrated in FIG. 24. As shown therein, the center right speaker 105, right speaker 107 and the surround right speakers 109 output the playback sound of the mixed audio data RM of the center right channel (CR), right channel (R) and the surround right channel (SR). As a result, if the sound of the right route in its entirety is unreproducible, a sound effect similar to that obtained during the usual or normal operation may be produced without sound interruption.

Figure 25:
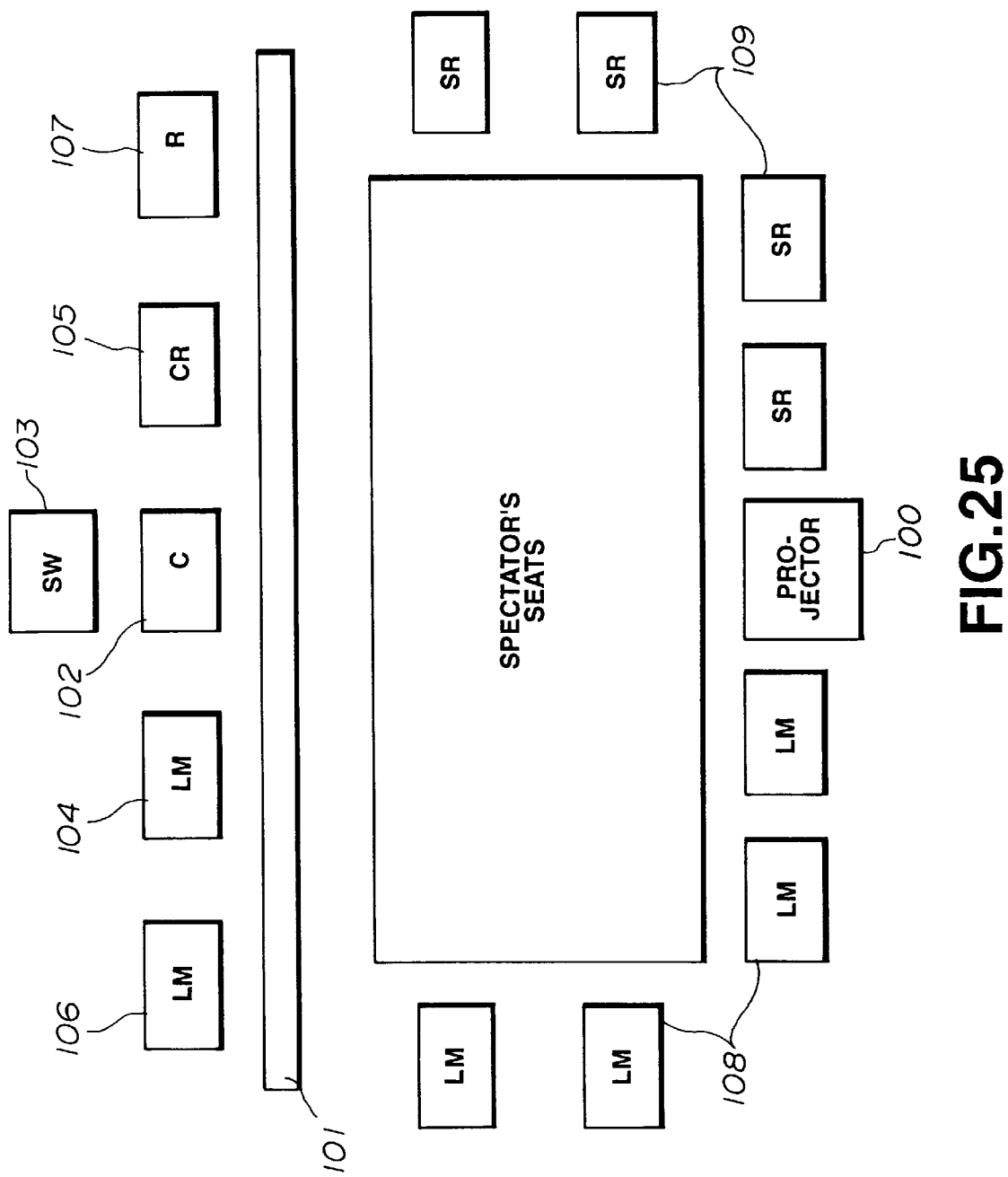
FIG. 25 illustrates still another speaker arrangement for receiving audio data recorded on the motion picture film of FIG. 1.

On the other hand, suppose that only audio data of the right digital sound track is reproduced. Such situation is illustrated in FIG. 25. As shown therein, the center left speaker 104, left speaker 106 and surround left speakers 108 output the playback sound of the mixed audio data LM of the center left channel (CL), left channel (L) and the surround left channel (SL). As a result, if the sound of the left route in its entirety is unreproducible, a sound effect similar to that obtained during the usual or normal operation may be produced without sound interruption.

Figure 26A:
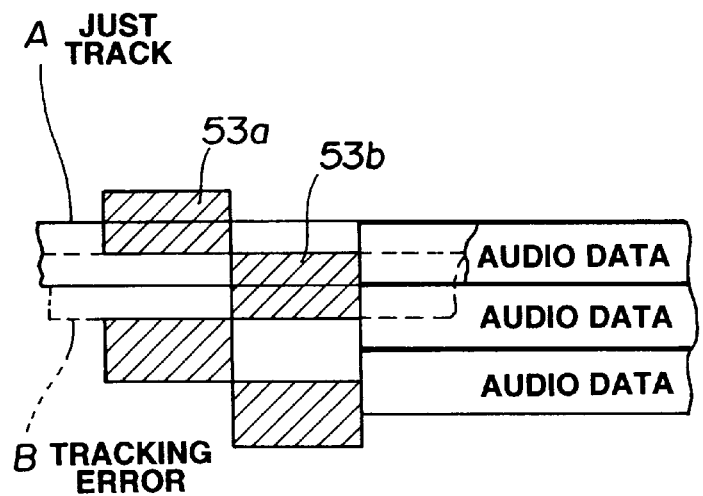
FIGS. 26a and 26b are diagrams to which reference will be made in explaining tracking error of CCD line sensor(s) of the apparatus of FIG. 19 in reproducing audio data from the motion picture film of FIG. 1.
Figure 26B:
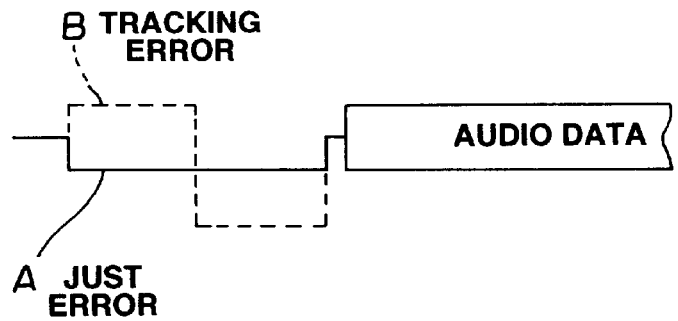

The audio data may be read out on-track by the CCD line sensors 20L or 20R as shown by a solid line A in FIG. 26a. Since the track patterns 53a and 53b are recorded at 90 degree phase positions relative to the audio data along the film running direction, the CCD line sensor, such as CCD line sensor 20L, reproduces only an upper half or a lower half of each of the tracking patterns 53a and 53b. Thus, the reproduced signals of the tracking patterns 53a and 53b correspond to the upper or lower half thereof, as indicated by the solid line A in FIG. 26b. Conversely, if the audio data is read off-track as shown by a broken line B in FIG. 26a, the tracking pattern 53b is reproduced substantially entirely. Thus, the reproduced signals of the tracking patterns 53a and 53b are shifted vertically as indicated by a broken line B in FIG. 26b, while reaching a signal level approximately twice the on-track level.

The above-described characteristics are utilized by the present motion picture film reproducing apparatus for correcting the readout timing of the CCD line sensors 20L and 20R so as to correct the tracking error.

Figure 27:
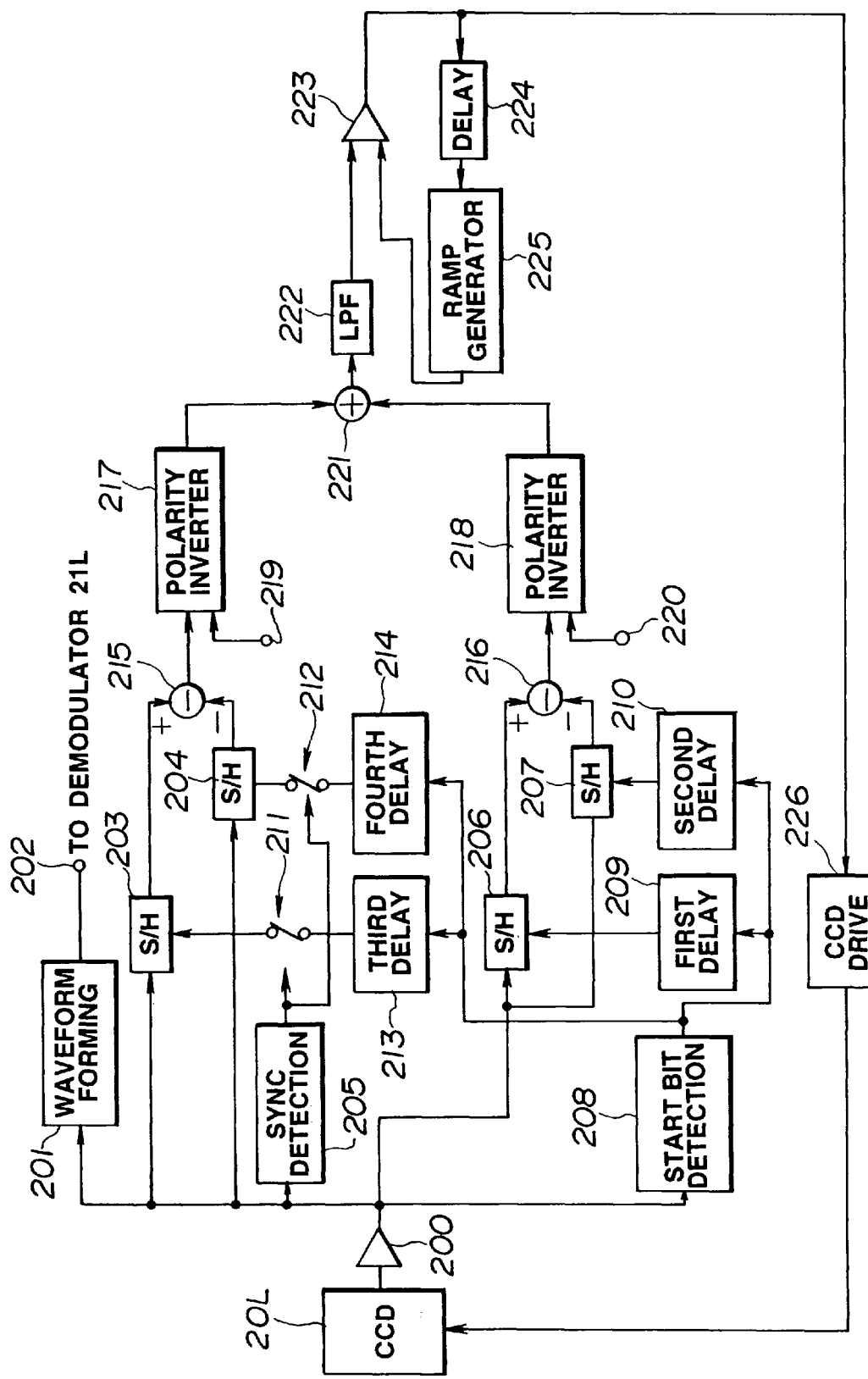
FIG. 27 is a block diagram of a tracking error system of the reproducing apparatus of FIG. 19 for controlling the readout timing of the CCD line sensor for correcting the tracking error associated with the left channel.

A tracking error correction system for the present motion picture film reproducing apparatus is illustrated in FIG. 27. More specifically, FIG. 27 illustrates the left-route tracking error correction system. However, the right-route channel tracking error correction system may be configured in a substantially similar manner. Consequently, only a description of the operation of the left-route tracking error correction system will be presented below, although, as is to be appreciated, the operation of the right-route tracking error correction system is substantially similar.

Figure 28:
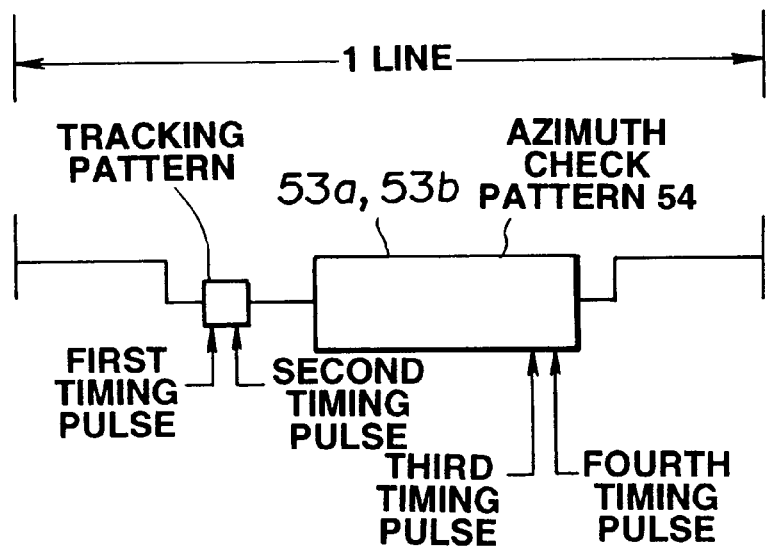
FIG. 28 is a diagram to which reference will be made in explaining the timing of sample-holding the tracking pattern and tilt detection pattern by the tracking error system of FIG. 27.

As shown in FIG. 27, the tracking patterns 53a and 53b and the audio data and so forth read out by the CCD line sensor 20L are supplied by way of an amplifier circuit 200 to a waveforming circuit 201, sample-and-hold circuits 203, 204, 206, 207, a synchronization detection circuit 205 and a start bit detection circuit 208. The waveform shaping circuit 201 waveform-shapes the respective data so as to generate a shaped rectangular wave which is supplied by way of an output terminal 202 to the demodulator 21L (FIG. 19) wherein demodulation and subsequent playback operations are performed. On the other hand, the start bit detection circuit 208 detects a start bit 58 (FIG. 17) recorded in a region between the light barrier or light-intercepting area 51 and the tracking pattern 53a and routes the detecting output to delay circuits 209, 210, 213 and 214, as shown in FIG. 27. Such detection output of the start bit is delayed by the first delay circuit 209, for sample-holding of the tracking pattern 53a, and a delayed output is supplied as a first timing pulse to the sample-and-hold circuit 206, as shown in FIG. 27. The detection output of the start bit is delayed by the second delay circuit 210, for sample-holding the tracking pattern 53b, and a delayed output is supplied as a second timing pulse to the sample-and-hold circuit 207, as shown in FIG. 27. The detection output of the start bit is delayed by the third delay circuit 213, for sample-holding the signal level of data recorded at two dots prior to the last dot of the azimuth check pattern 56, and a delayed output is supplied as a third timing pulse to a switch 211, as shown in FIG. 27. The detection output of the start bit is delayed by the fourth delay circuit 214, for sample-holding the last dot of the azimuth check or tilt detection pattern 56, and a delayed output is supplied as a fourth timing pulse to the switch 212, as shown in FIG. 27. Such first, second, third and fourth timing pulses are illustrated in FIG. 28.

The synchronization detection circuit 205 receives the data reproduced by the CCD line sensor 20L and detects therefrom the synchronization data (preamble) 55 shown in FIG. 17. The synchronization detection circuit 205 forms a relatively high-level data only during the playback time of the azimuth check pattern and supplies the data to switches 211 and 212.

The switches 211 and 212 are controlled so as to be turned on when supplied with the high-level data from the synchronization detection circuit 205. As a result, the switches respectively supply the third and fourth timing pulses from the third and fourth delay circuits 213 and 214 to the sample-and-hold circuits 203 and 204.

The sample-and-hold circuit 206 is adapted to sample-hold the tracking pattern 53a by the first timing pulse from the first delay circuit 209 and to supply the tracking pattern to one input of a subtractor 216. The sample-and-hold circuit 207 is adapted to sample-hold the tracking pattern 53b by the second timing pulse from the second delay circuit 210 and to supply the tracking pattern 53b to the other input of the subtractor 216. The sample-and-hold circuit 203 is adapted to sample-hold the signal level of the data recorded at the two dots prior to the Last dot of the tilt detection pattern 56 by the third timing pulse from the third delay circuit 213 and to supply the data to one input of a subtractor 215. The sample-and-hold circuit 204 is adapted to sample-hold the data of the last dot of the tilt detection pattern 56 by the fourth timing pulse from the fourth delay circuit 214 and to supply the data to the other input of the subtractor 215.

The subtractor 216 is adapted to obtain a difference between the two signals supplied thereto. In other words, the subtractor 216 detects the difference between the sample-held data of the tracking pattern 53a from the sample-and-hold circuit 206 and the sample-held data of the tracking pattern 53b from the sample-and-hold circuit 207. Such detected difference is supplied to a polarity invertor 218. Similarly, the subtractor 215 is adapted to obtain a difference between the two signals supplied thereto. In other words, the subtractor 215 detects the difference between the sample-held data of the two dots prior to the last dot of the tilt detection pattern 56 from the sample-and-hold circuit 203 and the sample-held data of the last dot of the tilt detection pattern 56 from the sample-and-hold circuit 204. Such detected difference is supplied to a polarity invertor 217.

The polarity invertors 217 and 218 are respectively supplied with polarity inverting data by way of input terminals 219 and 220, along with the detected difference signals from the subtractors 215 and 216. Each of the polarity invertors 217 and 218 is adapted to invert the detected difference signals line-by-line in response to the polarity inverting data and to supply an inverted detection output to an additive node 221. The additive node 221 sums the inverted detection outputs from the polarity invertors 217 and 218. The resulting sum data represents an error of the readout timing of the CCD line sensor 20L formed on the basis of the tracking patterns 53a and 53b and, the tilt detection pattern 56. Such sum data is supplied by way of a low-pass filter 222 to one input of a comparator 223.

Figure 29:
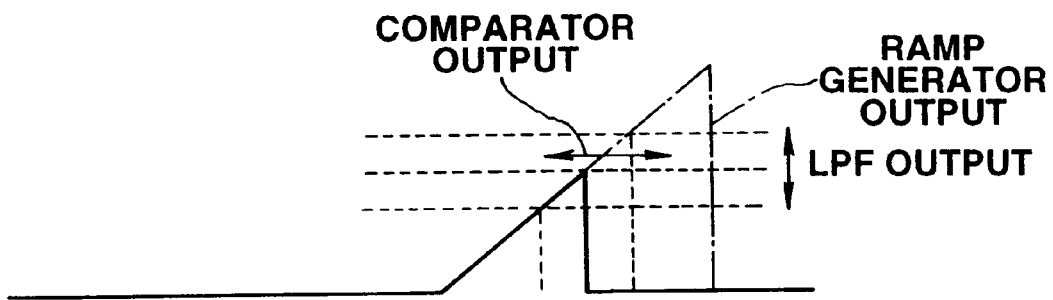
FIG. 29 is a graph illustrating a driving pulse of the CCD line sensor formed by the tracking error correction system of FIG. 27.

An output of the comparator 223 is supplied by way of a delay device 224 to a ramp generator 225 which, in turn, supplies a serrated wave having a level indicated by a chain-dotted line in FIG. 29 to the other input of the comparator 223. As a result, the output of the ramp generator 225 is variably controlled in response to the output of the low-pass filter 222, which is to the readout timing error of the CCD line sensor 20L. Thus, the comparator 223 outputs a serrated wave corresponding to a readout timing error of the CCD line sensor 20L, as shown by a broken line and a solid line in FIG. 29. This serrated wave is supplied to the delay circuit 224 and a CCD driving circuit 226. The CCD driving circuit 226 is adapted to control the readout timing of the CCD line sensor 20L in response to the serrated wave indicating the readout timing error.

Thus, the respective data may be read out while tracking correction is executed so that the readout timing of the CCD line sensor 20L is substantially in the just-tracking state at all times.

In the motion picture film 1 of the present invention, the tracking patterns 53a and 53b are recorded on only one of the sides of the digital sound tracks 5L and 5R so as to increase the data area, as previously described. However, if the tracking error is recorded on only one of the sides of the digital sound tracks 5L and 5R, tracking error correction capability may be lowered. However, since the azimuth check pattern 56 is recorded on a film block basis and the tracking error is corrected based upon each detection output of the tracking patterns 53a and 53b and the tilt detection pattern 56, recording the tracking patterns 53a and 53b on only one of the sides as described above does not lower the tracking error correction capability and increases the recording area for the audio data.

Although the dot of each data was described above as having a transverse size of 24.1$\mu$, the present invention is not so limited. For example, such dot size may have a value of approximately 24$\mu$, or other values such as 23.9$\mu$, 24.0$\mu$ or 24.2$\mu$.

Although preferred embodiments of the present invention and modifications thereto have been described in detail herein, it is to be understood that this invention is not limited to these precise embodiments and modifications, and that other modifications and variations may be affected by one skilled in the art without departing from the spirit and scope of the invention as defined by the appended claims.

What is claimed is:

1. A motion picture film comprising first and second digital sound tracks each extending along a film running direction for recording therein coding data and first and second pluralities of bytes of audio data corresponding to a number of frames in predetermined data patterns in the first and second digital sound tracks such that (i) each byte of the recorded audio data which includes a number of bits of data has a size of N bits (wherein N is an integer greater than or equal to 2) in the film running direction by 1 bit in the direction normal to the film running direction, (ii) first mix data associated with the audio data recorded in the first digital sound track is recorded in the second digital sound track and second mix data associated with the audio data recorded in the second digital sound track is recorded in the first digital sound track, and (iii) the audio data recorded in the first digital sound track pertaining to a respective frame is shifted by an amount corresponding to approximately 17.8 frames as compared to the audio data recorded in the second digital sound track pertaining to said respective frame and in which the coding data includes C1 parity data and C2 parity data.

2. A motion picture film according to claim 1, wherein the audio data is interleaved in a predetermined manner and the interleaved audio data is recorded in lines of recording areas of the first and second digital sound tracks.

3. A motion picture film according to claim 1, wherein each piece of the recorded audio data has a size of approximately 26.4$\mu$ by 24.1$\mu$.

4. A method for recording digital data on a motion picture film having first and second digital sound tracks each extending along a film running direction, said method comprising the steps of:

recording first and second pluralities of bytes of audio data corresponding to a number of frames in predetermined data patterns in the first and second digital sound tracks, respectively, such that (i) each byte of the recorded audio data which includes a number of bits of data has a size of N bits (wherein N is an integer greater than or equal to 2) in the film running direction by 1 bit in a direction normal to the film running direction, (ii) first mix data associated with the audio data recorded in the first digital sound track is recorded in the second digital sound track and second mix data associated with the audio data recorded in the second digital sound track is recorded in the first digital sound track, and (iii) the audio data recorded in the first digital sound track pertaining to a respective frame is shifted by an amount corresponding to approximately 17.8 frames as compared to the audio data recorded in the second digital sound track pertaining to said respective frame; and recording coding data having C1 parity data and C2 parity data in the first and second digital sound tracks.

5. A method for recording digital data according to claim 4, wherein the step of recording audio data includes interleaving the audio data in a predetermined manner and recording the interleaved audio data in lines of recording areas of the first and second digital sound tracks.

6. A method for recording digital data according to claim 4, wherein each piece of the recorded audio data has a size of approximately 26.4$\mu$ by 24.1$\mu$.

7. An apparatus for recording digital data on a motion picture film having first and second digital sound tracks each extending along a film running direction, said apparatus comprising:

means for recording first and second pluralities of bytes of audio data corresponding to a number of frames in predetermined data patterns in the first and second digital sound tracks, respectively, such that (i) each byte of the recorded audio data which includes a number of bits of data has a size of N bits (wherein N is an integer greater than or equal to 2), in the film running direction by 1 bit in a direction normal to the film running direction, (ii) first mix data associated with the audio data recorded in the first digital sound track is recorded in the second digital sound track and second mix data associated with the audio data recorded in the second digital sound track is recorded in the first digital sound track, and (iii) the audio data recorded in the first digital sound track pertaining to a respective frame is shifted by an amount corresponding to approximately 17.8 frames as compared to the audio data recorded in the second digital sound track pertaining to said respective frame; and means for recording coding data having C1 parity data and C2 parity data in the first and second digital sound tracks.

8. An apparatus for recording digital data according to claim 7, wherein the means for recording audio data includes means for interleaving the audio data in a predetermined manner and recording the interleaved audio data in lines of recording areas of the first and second digital sound tracks.

9. An apparatus for recording digital data according to claim 7, wherein each piece of the recorded audio data has a size of approximately 26.4$\mu$ by 24.1$\mu$.

10. A method for reproducing digital data from a motion picture film having first and second digital sound tracks each extending along a film running direction, said method comprising the steps of:

reproducing first and second pluralities of bytes of audio data corresponding to a number of frames from the first and second digital sound tracks, respectively, which had been recorded therein in predetermined data patterns such that (i) each byte of the recorded audio data which includes a number of bits of data has a size of N bits (wherein N is an integer greater than or equal to 2) in the film running direction by 1 bit in a direction normal to the film running direction, (ii) first mix data associated with the audio data recorded in the first digital sound track was recorded in the second digital sound track and second mix data associated with the audio data recorded in the second digital sound track was recorded in the first digital sound track, and (iii) the audio data recorded in the first digital sound track pertaining to a respective frame was shifted bit an amount corresponding to approximately 17.8 frames as compared to the audio data recorded in the second digital sound track pertaining to said respective frame; and reproducing coding data having C1 parity data and C2 parity data from the first and second digital sound tracks and performing error correction of the audio data by utilizing the reproduced coding data.

11. A method for reproducing digital data according to claim 10, wherein the step of reproducing audio data includes deinterleaving the audio data which had been interleaved in a predetermined manner and recorded in lines of recording areas of the first and second digital sound tracks and serially reproducing the deinterleaved audio signal.

12. A method for reproducing digital data according to claim 10, wherein each piece of the recorded audio data has a size of approximately 26.4$\mu$ by 24.1$\mu$.

13. An apparatus for reproducing digital data from a motion picture film having first and second digital sound tracks each extending along a film running direction, said apparatus comprising:

means for respectively reproducing first and second pluralities of bytes of audio data Corresponding to a number of frames from the first and second digital sound tracks which had been recorded therein in predetermined data patterns such that (i) each byte of the recorded audio data which includes a number of bits of data has a size of N bits (wherein N is an integer greater than or equal to 2) in the film running direction by 1 bit in a direction normal to the film running direction, (ii) first mix data associated with the audio data recorded in the first digital sound track was recorded in the second digital sound track and second mix data associated with the audio data recorded in the second digital sound track was recorded in the first digital sound track, and (iii) the audio data recorded in the first digital sound track pertaining to a respective frame was shifted by an amount corresponding to approximately 17.8 frames as compared to the audio data recorded in the second digital sound track pertaining to said respective frame; and means for reproducing coding data having C1 parity data and C2 parity data from the first and second digital sound tracks and performing error correction of the audio data by utilizing the reproduced coding data.

14. An apparatus for reproducing digital data according to claim 13, wherein the means for reproducing audio data includes means for deinterleaving the audio data which had been interleaved in a predetermined manner and recorded in lines of recording areas of the first and second digital sound tracks and for serially reproducing the deinterleaved audio signal.

15. An apparatus for reproducing digital data according to claim 13, wherein each piece of the recorded audio data has a size of approximately 26.4μ by 24.1μ.

16. A motion picture film comprising:

a picture recording area for recording therein a plurality of picture image frames; and first and second digital sound tracks each extending along a film running direction for recording therein coding data and first and second pluralities of audio data corresponding to a number of said picture image frames in predetermined patterns such that (i) each byte of the recorded audio data which includes a number of bits of data has a size of N bits (wherein N is an integer greater than or equal to 2) in the film running direction by 1 bit in a direction normal to the film running direction, (ii) first mix data associated with the audio data recorded in the first digital sound track is recorded in the second digital sound track and sound mix data associated with the audio data recorded in the second digital sound track is recorded in the first digital sound track, and (iii) the audio data recorded in the first digital sound track pertaining to a respective frame is shifted by an amount corresponding to approximately 17.8 frames as compared to the audio data recorded in the second digital sound track pertaining to said respective frame and in which the coding data is adaptable for performing error correction of the audio data.

17. A method for recording digital data on a motion picture film having a picture recording area for recording a picture image thereon and first and second digital sound tracks each extending along a film running direction, said method comprising the steps of:

recording first and second pluralities of bytes of digital audio data corresponding to a number of frames in predetermined patterns in the first and second digital sound tracks such that (i) each byte of the recorded audio data which includes a number of bits of data has a size of N bits (wherein N is an integer greater than or equal to 2) in the film running direction by 1 bit in a direction normal to the film running direction, (ii) first mix data associated with the audio data recorded in the first digital sound track is recorded in the second digital sound track and second mix data associated with the audio data recorded in the second digital sound track is recorded in the first digital sound track, and (iii) the audio data recorded in the first digital sound track pertaining to a respective frame is shifted by an amount corresponding to approximately 17.8 frames as compared to the audio data recorded in the second digital sound track pertaining to said respective frame; and recording coding data in the first and second digital sound tracks for use in performing error correction of the audio data.

* * * * *